US007716502B2

(12) United States Patent
Muresan et al.

(10) Patent No.: US 7,716,502 B2
(45) Date of Patent: May 11, 2010

(54) CURRENT FLATTENING AND CURRENT SENSING METHODS AND DEVICES

(75) Inventors: Radu Muresan, 19 Drohan Drive, Guelph, Ontario (CA) N1G 5H6; Stefano Gregori, Apt. 243, 78 College Avenue West, Guelph, Ontario (CA) N1G 4S7

(73) Assignees: Radu Muresan, Guelph, ON (CA); Stefano Gregori, Guelph, ON (CA)

( * ) Notice: Subject to any disclaimer, the term of this patent is extended or adjusted under 35 U.S.C. 154(b) by 822 days.

(21) Appl. No.: 11/509,036

(22) Filed: Aug. 24, 2006

(65) Prior Publication Data

US 2007/0076890 A1    Apr. 5, 2007

Related U.S. Application Data

(60) Provisional application No. 60/710,651, filed on Aug. 24, 2005.

(51) Int. Cl.
*G06F 1/26* (2006.01)
(52) U.S. Cl. .................. 713/300; 713/322; 713/340
(58) Field of Classification Search .................. 713/300
See application file for complete search history.

(56) References Cited

U.S. PATENT DOCUMENTS

| | | | | |
|---|---|---|---|---|
| 5,568,044 | A * | 10/1996 | Bittner | 323/272 |
| 6,219,723 | B1 * | 4/2001 | Hetherington et al. | 710/18 |
| 7,173,404 | B2 * | 2/2007 | Wu | 323/283 |
| 7,341,481 | B2 * | 3/2008 | Spiri et al. | 439/535 |
| 7,441,853 | B2 * | 10/2008 | Takata | 347/14 |
| 2005/0081073 | A1 * | 4/2005 | Williams | 713/320 |

OTHER PUBLICATIONS

Muresan, R.; Vahedi, H.; Zhanrong, Y.; Gregori, S. Power-Smart System-On-Chip Architecture for Embedded Cryptosystems, CODES+ISSS, Sep. 19-21, 2005, pp. 1-6, New York, USA.
Vahedi, H.; Muresan, R.; Gregori, S. Low-Voltage Wide-Range Built-in Current Sensing for System-On-Chip Applications, 2005 IEEE 2005 48th Midwest Symposium on Circuits and Systems (MWSCAS 2005), Aug. 7-10, 2005, pp. 843-846, vol. 1, Cincinnati, USA.

(Continued)

*Primary Examiner*—Nitin C Patel
(74) *Attorney, Agent, or Firm*—Miller Thomson LLP

(57) ABSTRACT

Flattening total current consumption of system having processing core and power supply input by current sensing within system at power supply input and controlling system current consumption such that system current is reduced if over reference current threshold, and increased if below reference current threshold. Inject additional current through digital injections cells working higher frequencies, by increasing switching activity, by increasing voltage supply to core, and by increasing operating frequency of processor core. Feedback signal indicates current consumption of system. Current consumption similarly decreased. Current sensed by mirroring input current inline with power supply input and compensating for voltage drop introduced by mirroring using opposing field effect transistors and maintaining outputs at same voltage through feedback control loop. Processor core may be general purpose processor core or cryptographic processor core. System may be system-on-chip or system-on-package. System includes processor core and current flattening device based on method. Also, current flattening device and current sensor. On chip current sensor sensing current draw of processor core.

51 Claims, 19 Drawing Sheets

OTHER PUBLICATIONS

Muresan, R.; Xu, L. Coprocessor Architecture with Scaled Dynamic Switching Activity for Embedded Cryptosystems, 2005 IEEE 48th Midwest Symposium on Circuits and Systems (MWSCAS 2005), Aug. 7-10, 2005, pp. 1761-1766, vol. 2, Cincinnati, USA.

Vahedi, H.; Muresan, R.; Gregori, S. On-Chip Current Flattening Circuit with Dynamic Voltage Scaling, 2006 IEEE International Symposium on Circuits and Systems (ISCAS 2006), May 21-24, 2006, pp. 4277-4280, Kos, Greece.

Muresan, R.; Gebotys, C. Current Flattening in Software and Hardware for Security Applications, International Conference on Hardware/Software Codesign and System Synthesis (CODES+ISSS 2004), Sep. 8-10, 2004, pp. 218-223, Stockholm, Sweden.

Li, X.; Muresan, R.; Vahedi, H.; Gregori, S. An Integrated Current Flattening Module for Embedded Cryptosystems, 2005 IEEE International Symposium on Circuits and Systems (ISCAS 2005), May 23-26, 2005, pp. 436-439, vol. 1, Kobe, Japan.

* cited by examiner

CURRENT FLATTENING AND CURRENT SENSING METHODS AND DEVICES

CROSS-REFERENCE TO RELATED APPLICATIONS

This application claims the benefit of the filing date of U.S. Provisional Patent Application No. 60/710,651 filed 24 Aug. 2005 under the title METHODS AND DEVICES INCORPORATING CRYPTOGRAPHIC ATTACK COUNTERMEASURES. The content of the above Provisional patent application is hereby expressly incorporated by reference into the detailed description hereof.

FIELD OF THE INVENTION

The invention relates to methods and devices incorporating cryptographic attack countermeasures. It also relates to on-chip power supply current sensors.

BACKGROUND OF THE INVENTION

Cryptography is a key technology in electronic security systems. If cryptosystems are not designed properly, they may leak information that is correlated to a secret key. Attackers who can access this leaked information may be able to recover the secret key and break the integrity of the cryptosystem. Attacks that use the power consumption of the cryptosystem as the leaked side-channel information are of significant concern, for example, in smart cards and other complex systems-on-chip or systems-on-package that use cryptographic hardware accelerator modules. Attacks based on power consumption analysis are called power analysis attacks (PAAs). PAAs base their success on the electromagnetic radiation effect of the power supply of the integrated circuit (IC) and exploit current consumption dependency on cryptographic data and algorithm.

Various software and hardware based countermeasures have been proposed for dealing with power analysis attacks. Software based countermeasures use techniques such as: code and key randomization, constant execution path algorithms, symmetric cryptographic algorithm, and blinding signature method. Hardware countermeasures are mainly based on current filtering techniques, current balancing in the system, desynchronization (generating current randomness within the current traces), or current injection (noise insertion).

Current randomization or masking methods need to generate enough current to cover the maximum current peaks of a microcontroller, microprocessor, or other CPU and memory. This is impractical and it can be damaging to the IC due to increased heat in the die. Also, the use of external or internal filtering capacitors does not eliminate data to current dependency.

Embedded systems that are subject to PAAs are widely used in applications that require support for security (e.g., smart-cards, PDAs, mobile phones, TV subscription boxes, VOIP phones, and so on). Security is becoming a new metric dimension in the design process of embedded systems, along with other metrics such as cost, performance, and power.

In general, an encryption algorithm and a decryption algorithm plus the description on the format of messages and keys form part of a cryptographic system (or a cryptosystem). A cryptosystem uses an encryption/decryption secret key to encrypt/decrypt plaintext/ciphertext messages and generate ciphertext/plaintext messages. Cryptosystems can be implemented in software, hardware, or a combination of both, and normally they are part of a larger embedded system. A cryptosystem must be able to protect the secret keys; otherwise, the security of the entire system is compromised.

As mentioned previously, the dependency of the power emanations to data and to arrival time of the encrypted data can be observed and linked to the input data and the secret key. Attacks that use this additional information and link it to the secret key of a cryptosystem are referred to as side-channel attacks. The main side-channel attacks include timing attacks, simple and differential power (SPA and DPA) attacks, and simple and differential electromagnetic attacks (SEMA and DEMA).

In these attacks, power consumption is monitored by using current sensors or by measuring the voltage drop across a small resistor placed in series with the power supply path of the cryptosystem. A DPA attack is one of the most efficient power analysis attacks. It relies on statistical analysis and error correction to extract information from power consumption that is correlated to the secret key. EM attacks exploit electromagnetic emanation resulting from data processing operations in CMOS devices. EM signals propagate via radiation and conduction (often by a complex combination of both) and can be captured by field probes and current probes. It is possible to combine power analysis attacks with EM emanation attacks and develop powerful multi-channel attacks.

On-chip power supply current sensors can be used for several purposes, including, for example, protecting confidentiality of cryptosystems, testing complex ICs, and improving battery lifetime in portable devices.

As discussed above, an increasing number of electronic systems deal with security issues. Not only are high-end systems (network routers, gateways, firewalls, and web servers) affected; so are low-end systems such as wireless handsets, portable storage devices, sensor networks, and smart cards. Using cryptanalytic techniques based on power analysis makes it possible to extract secret information and break the security by monitoring the power consumed by a cryptosystem. An on-chip current sensor can be used in shaping the power supply current to mask power dependent cryptographic information.

Many testing techniques for complex digital and mixed-signal circuits are based on current measurement. Typically, faulty circuits are detected by measuring the current drawn under certain input conditions. Similar methods can be applied also for testing or pre-screening analog circuits. In complex ICs on-chip current-measurement-based testing techniques can be used not only to detect malfunctions, but also to foresee possible failures during normal operation.

Furthermore, increasing battery lifetime is one of the main goals in designing portable systems. Battery discharge time does not exclusively depend on the average current (i.e., on the average power dissipation), but also on the current temporal profile. Qualitatively, a smooth profile will give a longer lifetime than a bumpy profile. On-chip current sensing can be used to improve the power supply current profile in complex mixed-signal ICs and increase battery lifetime.

Improvements and alternatives to methods and devices incorporating cryptographic countermeasures are desirable. Similarly, improvements and alternatives to IC current sensors are desirable.

SUMMARY OF THE INVENTION

In a first aspect the invention provides a method of flattening the total current consumption of a system having a processing core and a power supply input. The method includes current sensing from within the system at the power supply input to the system; and controlling, based on the sensed current, the current consumption of the system such that the current consumption of the system is reduced if over a reference current threshold, and increased if below a reference current threshold.

Current consumption at the power supply input may be increased by means of an analog current controlled source. The controlled source may be a wide MOS transistor controlled by an analog gate voltage.

Current consumption at the power supply input may be increased by injecting additional current within the system through digital injections cells that work at higher frequencies than clock frequency of the core. Current consumption at the power supply input may be increased by increasing the switching activity of the system. Current consumption at the power supply input may be increased by increasing voltage supply to the processor core from within the system. Current consumption at the power supply input may be increased by increasing operating frequency of the processor core from within the system.

The injection current may respond to a feedback signal based on the sensed current that indicates that the current consumption of the system is under a prescribed limit. The amount of increased switching activity may be controlled based on the sensed current consumption at the power supply input.

The current consumption at the power supply input may be decreased by reducing switching activity of the system. The current consumption at the power supply input may be decreased by reducing supply voltage to the processor core from within the system. The current consumption at the power supply input may be decreased by reducing operating frequency of the processor core from within the system.

The switching activity may be reduced by gating clock signals to the processor core from within the system. The switching activity may be reduced by using a pipeline architecture in the core that responds to a feedback signal derived from the sensed current that indicates that the current consumption of the system is over a prescribed limit.

The current may be sensed by mirroring input current inline with the power supply input and compensating for a portion of a voltage drop introduced by mirroring. The current may be sensed by mirroring input current using opposing field effect transistors and maintaining outputs of the field effect transistors at the same voltage through a feedback control loop between the outputs. The feedback control loop may include an operational amplifier that operates appropriately when the mirror field effect transistors operate in their triode region. The feedback control loop may include level shifting inputs to the operational amplifier to ensure appropriate operation of the operational amplifier when the mirror field effect transistors operate in their triode region.

The processor core may be a general purpose processor core. The processor core may be a cryptographic processor core. The system may be a system-on-chip. The system may be a system-on-package.

In a second aspect the invention provides a system including a processor core, a power supply input, a current sensor for sensing, from within the system, current at a power supply input to the system; and a control adapted to control, based on the sensed current, the current consumption of the system such that the current consumption of the system is reduced if over a reference current threshold, and increased if below a reference current threshold.

The current consumption at the power supply input may be increased by means of an analog current controlled source. The controlled source may be a wide MOS transistor controlled by an analog gate voltage.

The current consumption at the power supply input may be increased by increasing switching activity of the system. The current consumption at the power supply input may be increased by increasing voltage supply of the core. The current consumption at the power supply input may be increased by increasing clock frequency of the core.

The system may include one or more digital injection cells wherein current consumption at the power supply input is increased by injecting additional current within the system through the one or more digital injection cells that work at higher frequencies than clock frequency of the core.

The system may include an injection current control for controlling the digital injection cells wherein the injection current control responds to a feedback signal based on the sensed current that indicates that the current consumption of the system is under a prescribed limit.

The amount of increased switching activity may be controlled based on the sensed current consumption at the power supply input. The current consumption at the power supply input may be decreased by reducing switching activity of the system. The current consumption at the power supply input may be decreased by reducing supply voltage to the core from within the system. The current consumption at the power supply input may be decreased by reducing operating frequency of the core from within the system.

The switching activity may be decreased by gating clock signals to the core from within the system. The switching activity may be decreased by using a pipeline architecture in the core that responds to a feedback signal derived from the sensed current that indicates that the current consumption of the system is over a prescribed limit.

The current sensor may be adapted to sense the current by mirroring input current inline with the power supply input and compensating for a portion of a voltage drop introduced by mirroring. The current sensor may be adapted to sense the current by mirroring input current using opposing field effect transistors and maintaining outputs of the field effect transistors at the same voltage through a feedback control loop between the outputs. The feedback control loop may include an operational amplifier that operates appropriately when the mirror field effect transistors operate in their triode region. The system may include level shifting inputs to the operational amplifier to ensure appropriate operation of the operational amplifier when the mirror field effect transistors operate in their triode region.

The system may be a system-on-chip. The system may be a system-on-package. The processor core may be a cryptographic processor core. The processor core may be a general purpose processor core. The system may be tamper resistant to resist external access to core current consumption information, except at the power supply input to the system.

In a third aspect the invention provides a current flattening device for use in association with a processor core. The device includes a current sensor for sensing, from within the device, current at a power supply input to the device, and a control adapted to control, based on the sensed current, combined current consumption of the device and the core such that the combined current consumption is reduced if over a reference current threshold, and increased if below a reference current threshold.

The device and the core may be a system-on-chip. The device and the core may be a system-on-package. The processor core may be a cryptographic core. The processor core may be a general purpose processor core.

In a fourth aspect the invention provides a system including a current sensor and a processor core on a single IC chip, wherein the current sensor is adapted to sense current by mirroring input current inline with a power supply input to the core and compensating for a portion of a voltage drop introduced by mirroring.

In a fifth aspect the invention provides a system including a current sensor and a processor core on a single IC chip, wherein the current sensor is adapted to sense current by mirroring input current inline with a power supply input to the core using opposing field effect transistors and maintaining outputs of the field effect transistors at the same voltage through a feedback control loop between the outputs.

Other aspects of the invention including for example methods of operating the systems and the device and further systems and devices will be evident from the detailed description and drawings hereof.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DETAILED DESCRIPTION OF THE PREFERRED EMBODIMENT

Several different embodiments will be described herein that incorporate various features. The order of embodiments is generally from least complex to most complex; however, this is not always the case. It is to be understood that the features of one embodiment may be used in other embodiments with consequent modification. The order of embodiments does not reflect preference of one embodiment over another.

Figure 1:
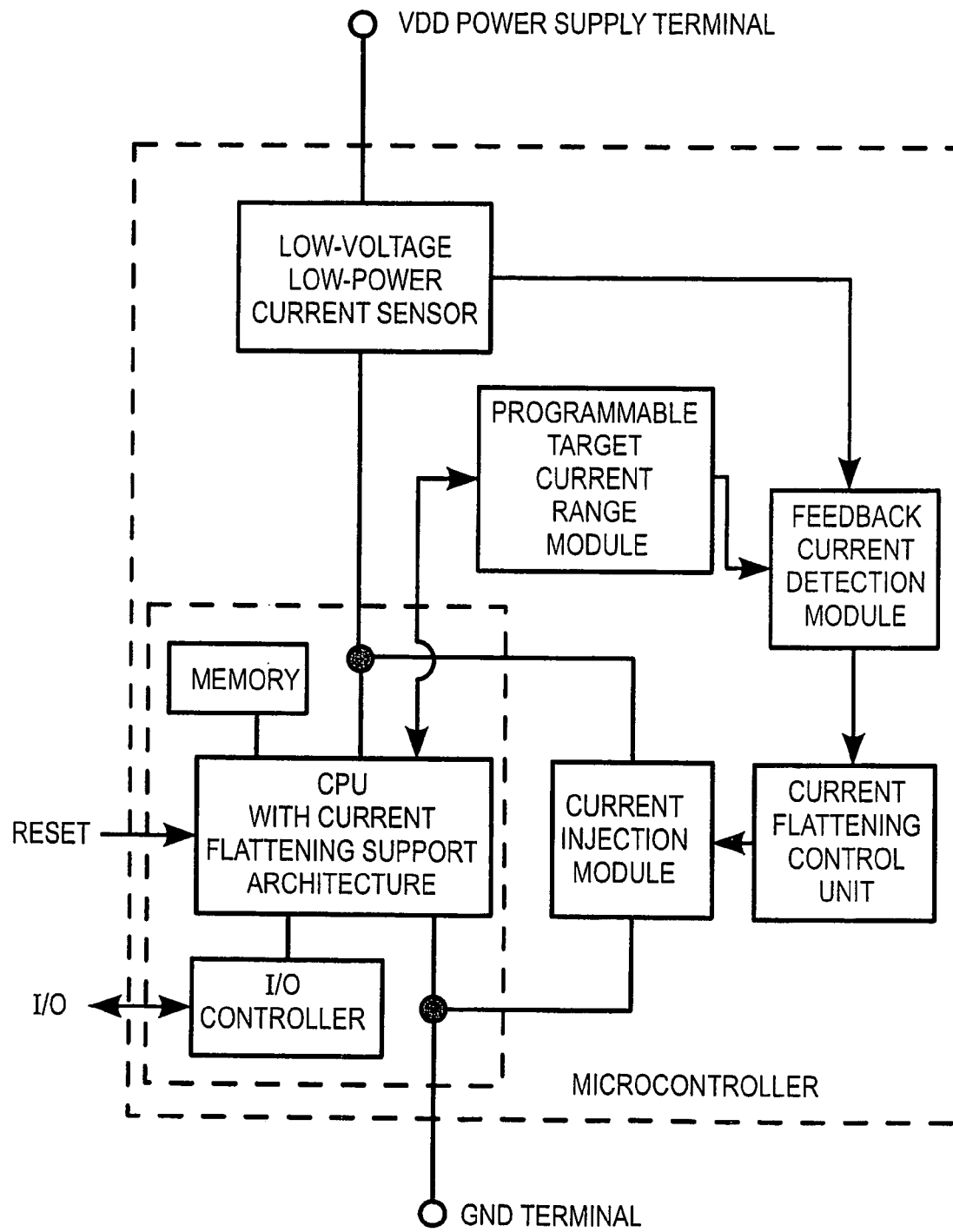
FIG. 1 is a block diagram of a system, implemented as a coprocessor, in accordance with an embodiment of an aspect of the present invention.

Referring to FIG. 1, a system has a low-voltage low-power current sensor, and supporting hardware for the purpose of monitoring in real-time the current or power consumption of the system. The system is implemented as an integrated system-on-chip, a single IC. The system can be implemented for performing cryptographic functions in the processor core in which case the system is a cryptosystem. The processor core can be a general purpose processor core or a cryptographic processor core. The system can be implemented as a coprocessor for performing cryptographic functions in support of external processors, not shown. The current mirror sensor for monitoring total current consumption of a system provides enhanced features for security, testing, and power-management applications. Hardware features included in the system for supporting security applications are: microcontroller or other CPU with current flattening support architecture, the low-voltage low-power current mirror sensor, programmable target range control module, feedback current sensing module, current injection module, flattening current control module. An application of this system is the development of secure cryptographic systems (cryptosystems). The system can provide a system-on-chip (single IC) architecture that reduces current to data and algorithm dependency in cryptosystems applications. A microcontroller together with the integrated current sensor and related feedback elements can be used in developing power aware systems, power management systems and IC testing systems. The microcontroller is also utilized as the cryptographic processing core, simply referenced as the core herein. This description is not limited to a microcontroller as the core, other suitable cores may be utilized as will be evident to those skilled in the art based on their common general knowledge and this description.

A system-on-chip architecture is an example of a system that resists external access of current consumption information for the core to a power input point of the system, and is tamper-resistant at least to this extent. If an attacker is to attempt to access the processor core directly then the system would likely be rendered inoperative. In systems-on-chip implementations an attacker will access only one power input pin connected to a main power supply. An example of another such tamper-resistant system is a system-on-package (SoP) implementation.

Those elements of the cryptographic system utilized for current flattening as described herein for the embodiment of FIG. 1 and other cryptographic system embodiments described herein are collectively referenced herein as a current flattening device. As described herein a cryptographic processing core may be utilized as part of the current flattening device (for example when implementing the support architecture of FIG. 1 and the pipeline architecture to be described with regard to FIG. 3) or may be implemented separately therefrom with the core limited to cryptographic processing.

The system uses a current-flattening method in order to diminish the current to data and algorithm dependency of the system. Real-time current measurements are provided by the current sensor and are used by the system in a feedback loop to control the current consumption level of the system within a prescribed range and obtain a flattened total current consumption at the power supply input of the system.

The low-voltage low-power current sensor may be a current mirror configuration circuit with a level-shifter for voltage compensation as will be later described. Using this circuit, the total current consumption of the system may be measured precisely with a minimum voltage drop (for example, less than 0.4V across the sensor) for a wide range of power supply currents.

The programmable target range control module is programmed by the microcontroller to store a lower limit (Imin) and an upper limit (Imax) of a target range for the current. These range limits together with a signal generated by the current sensor are used by the feedback current module to generate current signals that can be used by the controller.

At least two digital control signals, called ICS (increase current signal) and CCS (cut current signal) are used by the current flattening control unit to regulate the total current consumption of the system. Other signals, not shown, could be used such as 4-8 bits representation of the measured current value can be delivered by an analog-to-digital converter to the microcontroller. A digital value of the current consumption can be used for real-time self-testing algorithms and for various real-time power-management applications.

The current control flattening unit has a logic interaction with the control logic of the microcontroller. As the signal ICS is activated due to current levels under Imin, the current flattening module activates an injection module that works in parallel with the execution modules of the microcontroller. The injection module can use digital or analog techniques to add extra current consumption until the current consumption of the system increases above Imin level. This extra consumption results in additional current drawn into the system (i.e. injection of current into the system). The level of the current injected is controlled based on the slope of the power supply current. The higher the slope the more current is added, the lower the slope the less current is added.

The state of the microcontroller when ICS is active is called a "high-current" state. The microcontroller will be in high-current state until the measured current rises above Imin level. When CCS is active the current injection control module puts the microcontroller's pipeline modules (F, D, E, and W) in a wait mode. In this mode the current consumption of these modules is very small. Also, during the time when the CCS signal is active the pipeline is stalled by gating the clock to the pipeline modules. In this way the switching activity of the microcontroller is reduced to a minimum. Reducing the switching activity of the processor reduces the level of the current consumption. The state of the microcontroller when CCS is active is called a "low-current" state. The microcontroller will be kept in the low-current state until the current of the system is reduced under Imax.

Figure 2:
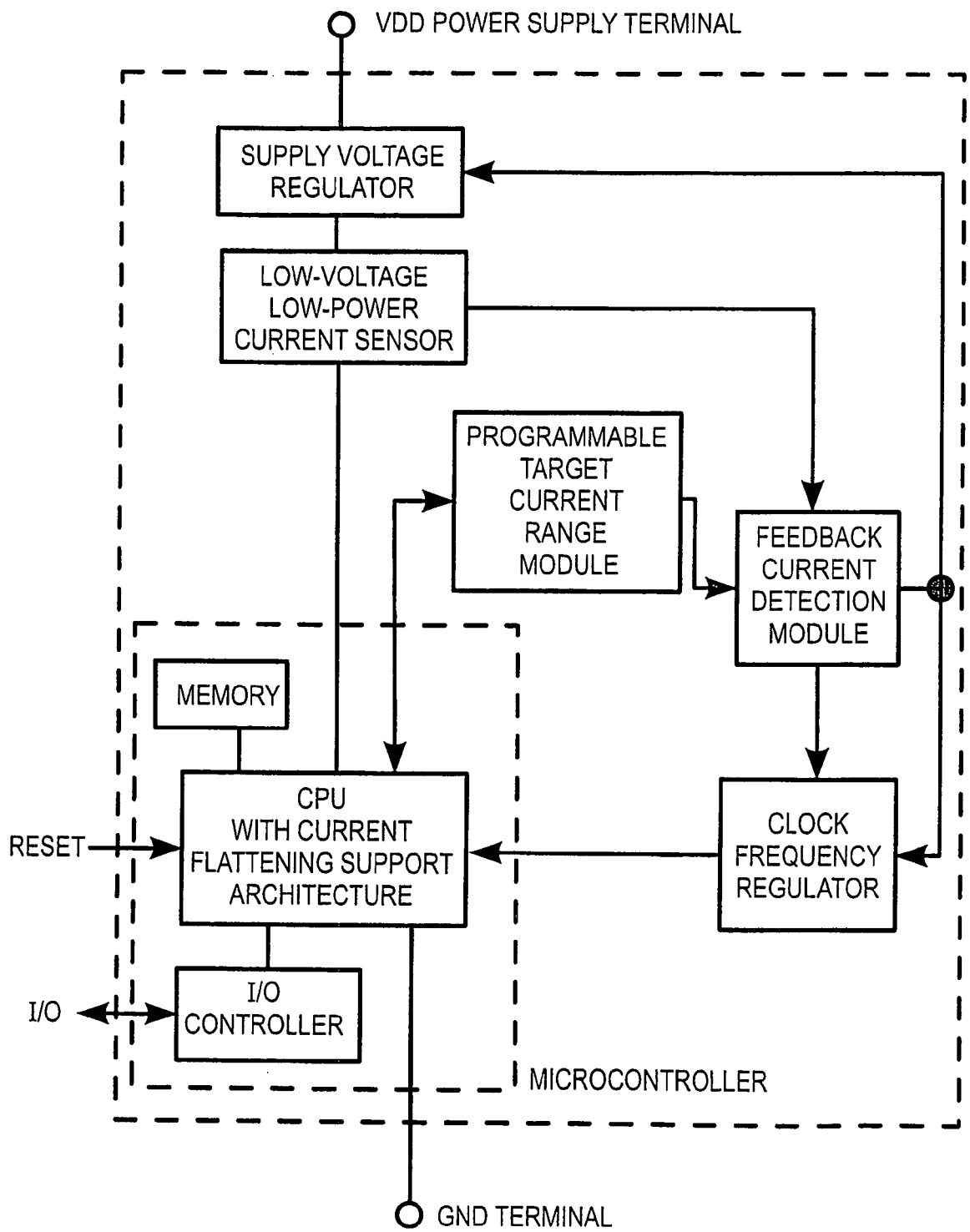
FIG. 2 is a block diagram of the system of FIG. 1 in accordance with an embodiment of an aspect of the present invention with variable voltage supply and variable frequency.

Referring to FIG. 2, the flattening of the system's current consumption based on real-time current measurements can also be performed by dynamically controlling the power supply VDD and the frequency of the working clock (Clock) of the microcontroller. For clarity, there is also a voltage regulator, not shown, in the system of FIG. 1. In the embodiment of FIG. 1 the voltage is regulated through a voltage control regulator that is controlled by the current measured by the sensor.

Figure 3:
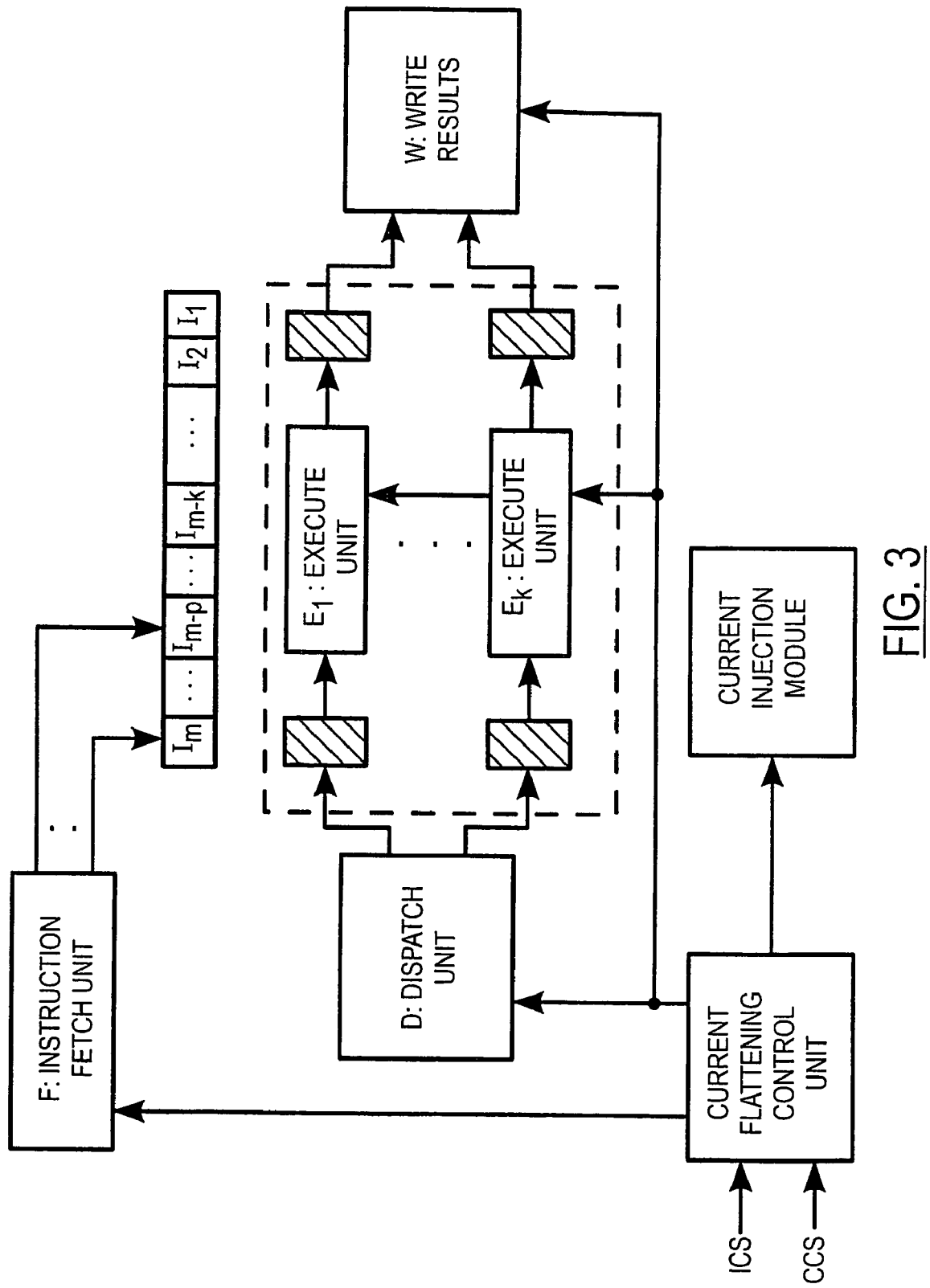
FIG. 3 is a diagram of a pipeline architecture for a microcontroller with current flattening support for use in the system of FIG. 1.

Referring to FIG. 3, a general pipeline architecture with current flattening support is incorporated into the CPU. The current consumption is increased by activating the current injection module and by controlling the VDD. When the ICS is active the total current of the system is increased by activating the current injection module or increasing the VDD until the current consumption rises over Imin. When the CCS is active the VDD is dropped to a lower level or the switching activity of the processor is scaled down until the current consumption is reduced to levels lower than Imax. Typically, there will be maximum limits and minimum limits that exist for VDD. Outside these limits the functionality of the processor may be compromised. Where VDD cannot be increased or decreased than current control cases may be done by using the techniques described with respect to FIG. 2.

By having a current measurement feedback, the system is capable of regulating the current consumption within a programmable target range that can be lower than the maximum current consumption of the microcontroller. In this way the reliability of the chip is increased by keeping the heat dissipation low. Also, the system can regulate the total current consumption of a cryptosystem in real-time making sure that during any secure transmission the power analysis attacks are limited. The system uses effective techniques for regulating current consumption. Current can be reduced through a feedback loop system by using a special processor architecture that reduces the dynamic component of the current, for example, in a CMOS device.

Injecting (drawing) extra current may be performed through a digital method or an analog method. For example, a digital method can use a number of switching cells that can be activated in a controllable manner. These switching cells can inject current at a higher frequency than the microcontroller's frequency. In this way current dependency on data is controlled at the processor cycle level. An analog technique can use a fast controllable current source to inject extra current when needed. Both of these injecting techniques require extra chip area that is a function of the maximum current needed to be injected. If the maximum current is kept to a low level then this area is reduced.

The integrated current sensor provides real-time current measurements of the system. These measurements are used to regulate the power consumption of the system. The target range of the regulated current is programmable (for example, through the microcontroller and company registers incorporated into the system) and can be adjusted for protecting any security implementation against power analysis attacks. The system flattens the current and limits current to algorithm and data dependencies. The current is flattened in real-time and current dependencies can be limited at clock cycle level. The system can include a voltage and a frequency regulator module in order to reduce or eliminate need for the injection modules and thus reduce chip area. The current flattening modules are activated only when needed and thus the power consumption of the chip is kept low. Also, the real-time current measurements provided through an A/D converter can be used to develop software applications for self-testing and energy conservation (battery lifetime improvement).

The system can be used by smart card controller manufacturers to develop tamper resistant controllers. The system can, for example, be implemented as an integrated system-on-chip. Alternatively, the current flattening device can be implemented separate from the core, for example on separate silicon layers, with the layers secured together using known techniques to create an integrated tamper resistant system. Also, current measurement and current flattening features can be incorporated in complex processors that use cryptographic hardware accelerators supporting, for example, DES, 3DES, AES, RSA, SHA-1, and other encryption algorithms.

The system provides support for security, testing and power management. Chips implementing the system can provide features in software that allow programmable current range control, real-time power analysis attacks protection, life time battery improvement capabilities, and chip functionality testing.

Figure 4:
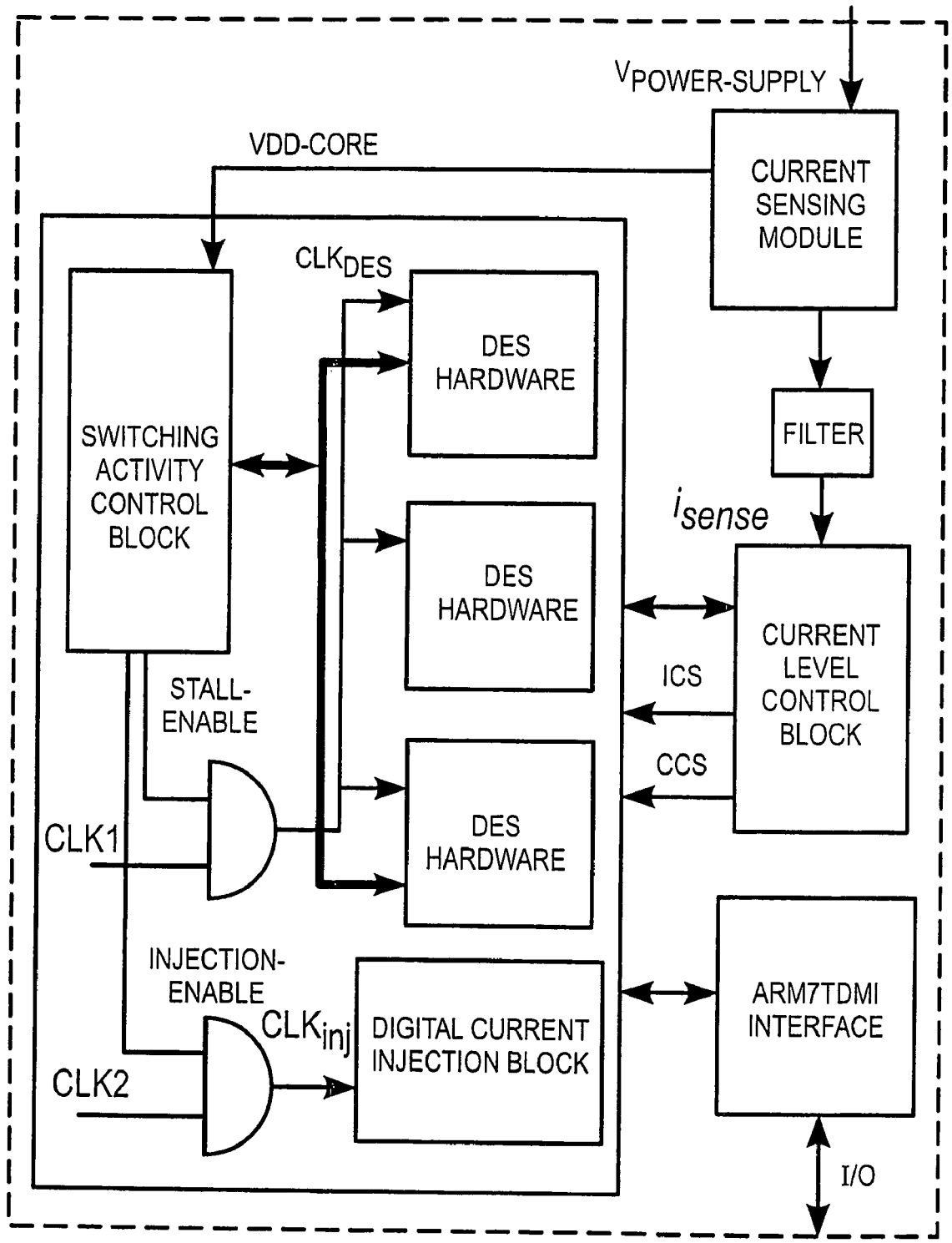
FIG. 4 is a block diagram of a system in accordance with an embodiment of an aspect of the present invention for DES applications.

Referring to FIG. 4, a specific DES application of the system will now be described as an example. Since its invention, the security of DES has been studied intensively. Various techniques have been invented to attack DES, but the most successful attack has been an exhaustive search of the key space. A variation of this attack is DPA. DPA on DES uses exhaustive search on 6-bit sub-block keys of a round key (round 16) and power consumption records of known ciphertexts. As a result the DES algorithm has been declared obsolete. However, it is used here as an example due to its simplicity and due to the fact that variants of the DES algorithm such as 3-DES are in use and are considered secure. These principles described herein will also apply to implementation for other algorithms. The principles are not algorithm dependent and they can be applied to any cryptographic algorithm based on the description provided herein.

There are three major sources of power dissipation in digital CMOS circuits, which are summarized in the following equation:

$$P_{tot} = p_t(C_L \cdot V \cdot V_{dd} \cdot f_{clk}) + I_{sc} \cdot V_{dd} + I_{leak} \cdot V_{dd} \quad (1)$$

The first term on the right represents the switching component of the power and it is a function of the loading capacitance $C_L$, clock frequency $f_{clk}$, activity factor $p_t$, voltage swing V, and the supply voltage $V_{dd}$. The second term is due to the direct-path short circuit current $I_{sc}$ and the supply voltage $V_{dd}$, and the third term is due to the leakage current $I_{leak}$ and the supply voltage $V_{dd}$ in CMOS devices. It is known that the switching component dominates the power consumption $P_{tot}$.

Within an embedded system, the power consumed by the underlying hardware is a function of the complexity of the hardware, the program application, and the data manipulated by the program. For a given software application P, when the processor's voltage supply is $V_{dd}$, the average current consumption per application is I, the total number of clock cycles per application is N, and the clock period is τ, the average energy consumption per application can be determined by the following relation:

$$E_{average/program} = V_{dd} \cdot I \cdot N \cdot \tau \quad (2)$$

When further assumptions related to (1) are made, the average power and the energy consumption for the application P can be expressed as:

$$P_{tot} = P_{sw} + P_{stat} = C_{avg} \cdot V^2_{dd} \cdot f + V_{dd} \cdot I_{leak}$$

$$E_{tot} = P_{tot} \cdot T = C_{tot} V^2_{dd} + V_{dd} \cdot I_{leak} \cdot T \quad (3)$$

In (3), $P_{tot}$ is the total power (the switching $P_{sw}$ plus the static $P_{stat}$), $C_{avg}$ is the total average capacitance being switched by the executing program per clock cycle, f is the operating frequency, $I_{leak}$ is the leakage current, and $C_{tot}$ is the total capacitance switched by the executing program. In CMOS gates, both the current through the MOS transistors and the equivalent resistance of the MOS transistors are dependent on the power supply. By varying $P_t$, CL, Vdd, f or Ileak the power consumption of the system can be changed and ultimately the profile of the current and voltage at the power supply pin. As a result, principles such as voltage scaling, clock scaling, activity factor scaling, combined with the current injection technique can be used to achieve power and current flattening or simply to create misalignment, randomness, or reduced peak-to-peak (Pk-Pk) current variation in the power consumption of a system. For this DES application, the current consumption of a cryptosystem is controlled through dynamic control of chip activity. This includes dynamic control of clock frequency (by introducing stall periods), parallel modules control, and dynamic control of injected current.

As mentioned previously, the secure version of the DES algorithm is the 3-DES algorithm. Constructively 3-DES is composed of two DES encryption modules and one DES decryption module. For simplicity, the example described herein is based on DES. For a 3-DES algorithm the DES hardware module must be replaced with a 3-DES hardware module. The system presented in FIG. 4 is a cryptographic coprocessor that targets a hardware implementation of a DES algorithm interfaced with separate ARM7TDI processor core. The coprocessor includes various modules that support dynamic switching activity control in order to control the current consumption of the coprocessor.

A current sensing module measures the total current consumption of the coprocessor. The measurement of the current can be done, for example, through an integrated resistor or through a current mirror circuit. A current level control block is responsible for generating two control signals called ICS (increase current signal) and CCS (cut current signal). These signals are generated when the sensed current $i_{sense}$ is under or above, a current reference level: preprogrammed into this block. The ARM7TDMI interface is responsible for facilitating communication between the coprocessor and an ARM7TDMI processor core. A switching activity control block is responsible for controlling switching activity of the coprocessor. If the CCS signal is active then the DES hardware is stalled by disabling the clock signal CLK1 until the $i_{sense}$ current falls under the reference current. This reduces the switching activity of the coprocessor and ultimately the total current consumption. When ICS signal is active the digital current injection block is activated. This increases the switching activity of the processor and ultimately the total current consumption. The DES hardware and the digital current injection blocks are described in more detail below.

Typically, the state of a processor changes at every clock cycle. The switching activity within a CMOS synchronous circuit is initiated by the rising/falling edges of clock signals. Due to delays within the circuit paths the switching of the processor's circuits happens at various times within the clock period. As a result, in order to maintain the system's current to a fixed $I_{ref}$ value (and mask the current to data dependency at system level) fast digital or analog current injection modules are needed.

Figure 5:
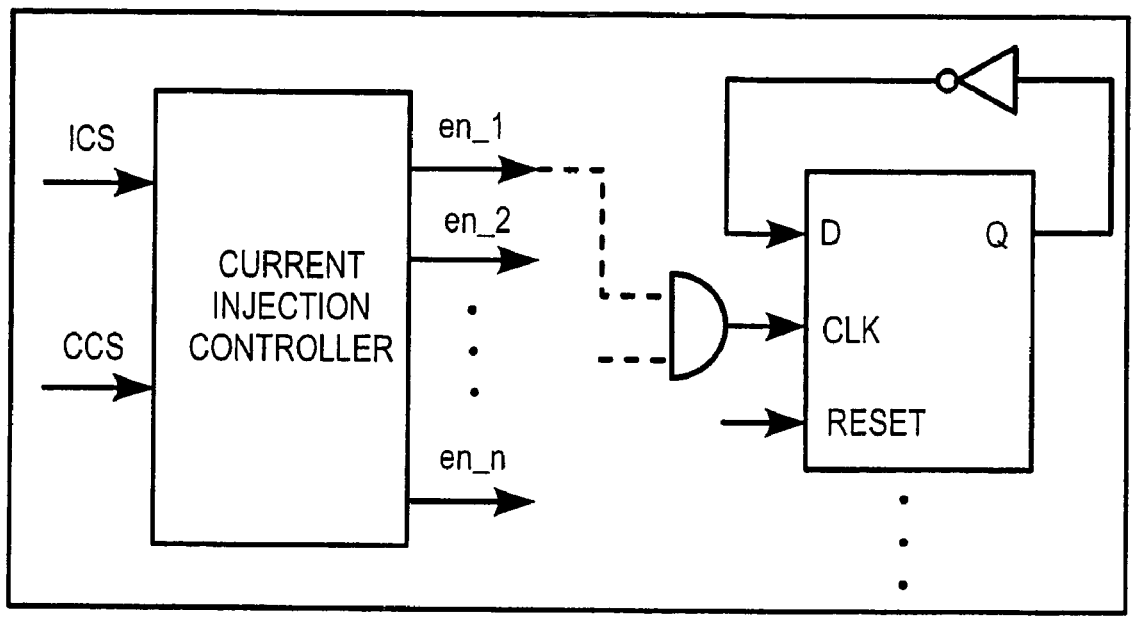
FIG. 5 is a block diagram of a digital current injection macro-cell for use in the system of FIG. 4.

Referring to FIG. 5, a block diagram of a suitable example digital current injection module is shown. The example module is composed of a current injection controller and of n current injection macro-cells. An example injection macro-cell is composed of a number of basic switching cells that contain a D flip-flop, an inverter, and a feedback connection. The current injection controller activates a given number of macro-cells depending on control signals CCS and ICS. As long as the CCS signal is active, the digital injection module activates a controllable number of switching cells.

Thus the switching activity of the system increases and based on (1) the total current consumption at the power supply pin. As a result, by increasing the switching activity during the system's clock period, the total current consumption of the system is increased and the output current can be flattened at clock level. By enabling one macro-cell a fixed average current per cycle is injected. In the preferred embodiment the frequency of operation for these cells ($CLK_{inj}$) is at least 8 times greater than the DES frequency ($CLK_{DES}$). This is to increase the current response and to be able to control the current that is developed around the rising and the falling edges of the $CLK_{DES}$. In the embodiment presented here, a clock frequency CLK2 was used that is 8 times greater than the system's clock frequency CLK1.

Figure 6:
FIG. 6 is a diagrammatic illustration of a DES hardware block for use in the system of FIG. 4.
Figure 7:
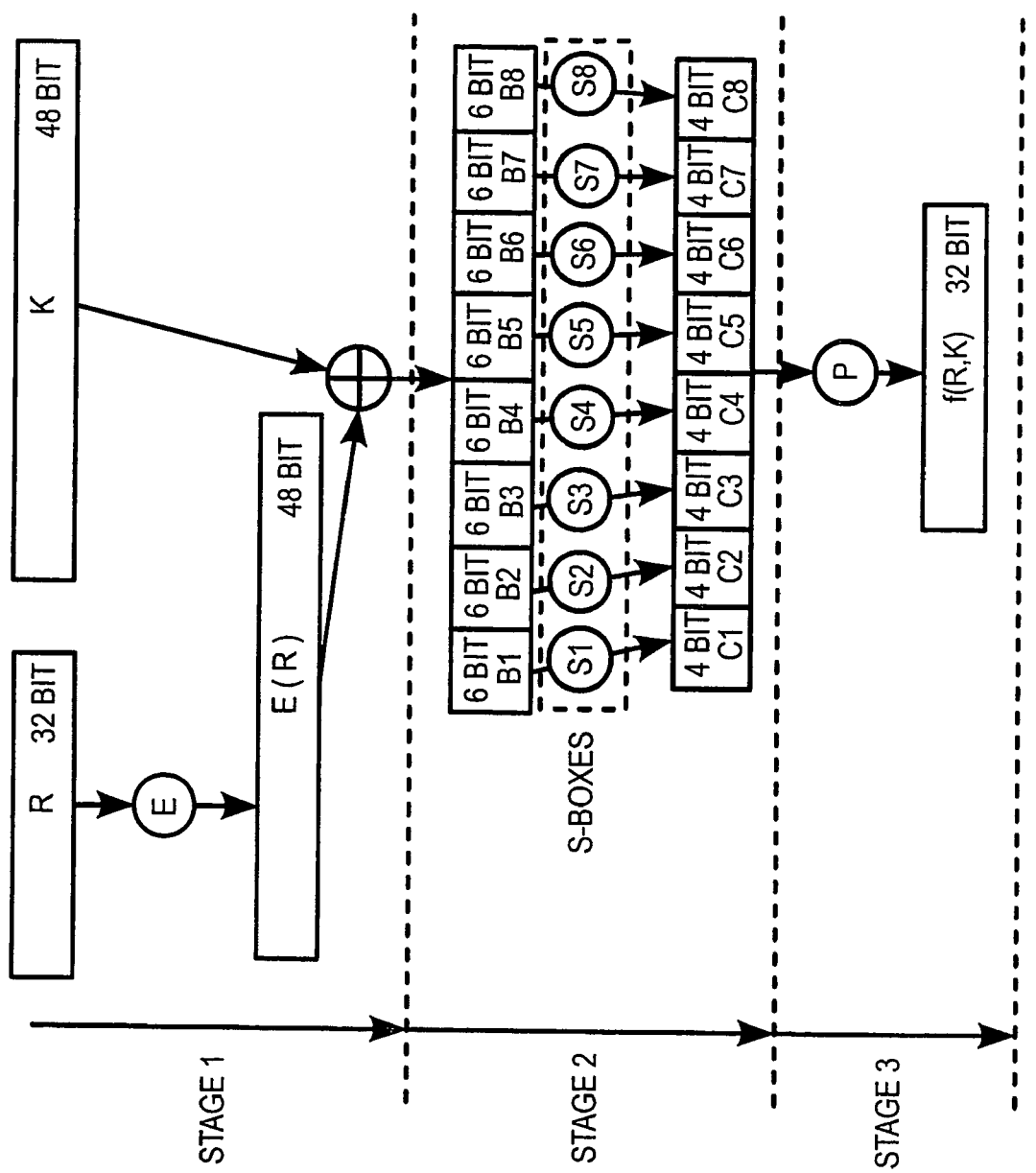
FIG. 7 is a VHDL stage implementation of the DES hardware block of FIG. 6.
Figure 8:
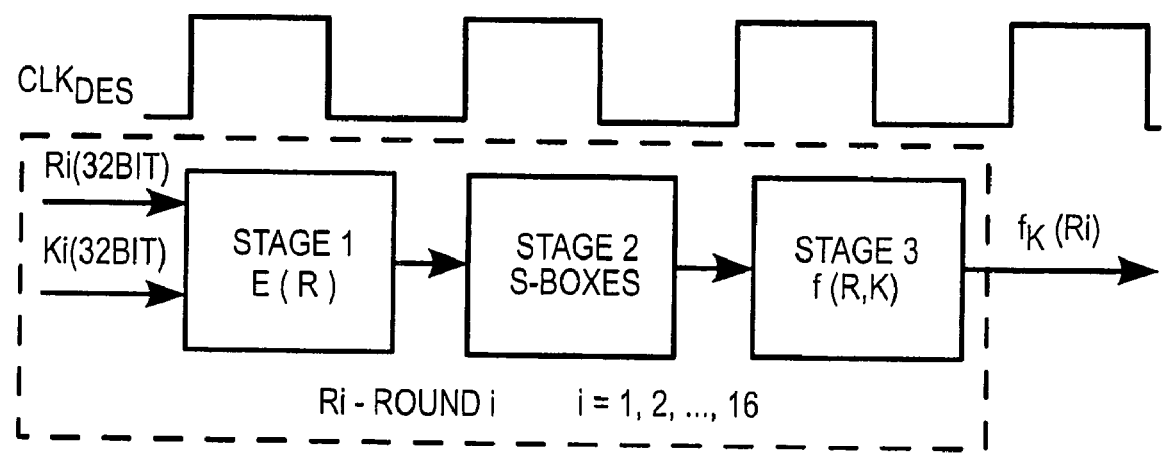
FIG. 8 is a round component diagram for timing of the stage implementation of FIG. 6.

Referring to FIGS. 6-8, a general VHDL structure of an example DES hardware block is shown. For this example, performance and the cost were not critical factors in the design. The main goals of the implementation were simplicity, functionality, and dynamic control of switching activity. The DES cryptosystem used is a slightly modified Feistel cipher with alphabet {0, 1} and block length 64-bit.

Referring to FIG. 6, the inputs to the DES algorithm are 64-bit plaintext blocks and 64-bit DES keys. One DES key can be used to encrypt more than one plaintext block. From a chosen DES key, 16 individual round keys are generated for this embodiment.

Given a 64-bit plaintext p and a 64-bit chosen key, DES works in three steps:

Step 1. An initial permutation IP is applied to p. This is a bit permutation on bit vectors of length 64 that is independent of the chosen key.

Step 2. A 16-round Feistel cipher is applied to the permuted plaintext.

Step 3. The cipher text is constructed using the inverse permutation $IP^{-1}$.

The encryption function $E_k$ of the Fiestel cipher for a DES key k works as follows. The 64-bit plaintext p is split into two halves of length 32-bit; that is $p=(L_0, R_0)$. Then the sequence $(L_i, R_i)=(R_{i-1}, L_{i-1} (XOR) f_{ki}(R_{i-1}))$ for i=1, 2, ..., 16 is constructed and $E(L_0, R_0)=(L_{16}, R_{16})$ is set. The decryption of the Fiestel cipher is performed in a reversed order. In order to generate a sequence $(L_i, R_i)$ the block cipher performs a set of round bit operations on the $R_{i-1}$ and $L_{i-1}$ halves.

Referring to FIG. 7, the VHDL implementation of the DES hardware is based on the stage decomposition of a DES round operation. The block diagram of a $f_{ki}(R_{i-1})$ sequence operation is shown. The following describes the operations contained in each stage.

Stage 1 is called the E(R) stage. In this stage, the 32-bit $R_i$ argument is expanded by the expansion function E to a 48-bit string E(R). The string E(R) is XOR-ed with the corresponding round key $k_i$ and generates a 48-bit string B.

Stage 2 is called the S-Box stage. In this stage the string B is divided into 8 equal groups (B1, B2, ..., B8). These groups are passed through the so-called S-boxes and the 48-bit string B is converted into a 32-bit string C. The individual Si boxes represent table transformations from a 6-bit string to a 4-bit string. Specifically, row and column values obtained from the corresponding Bi representations are converted into table values.

Stage 3 is called the f(R,K) stage. In this stage a bit permutation P is applied to the C representation and the $f_{ki}(R_{i-1})$ is generated.

The complete VHDL implementation includes Step 1 and Step 3 operations into the Stage 1 and Stage 3 blocks, respectively. Based on the above stage division various pipelined and parallel implementations of the DES and 3-DES algorithms are possible. The example DES embodiment described herein is implemented by sequentially connecting 16 round components.

Referring to FIG. 8, the round component implements the above stages in 3 clock cycles. As a result, the entire DES encryption takes 48 clock cycles. In order to increase the performance of the system and allow for dynamic control of the switching activity 3 parallel blocks of the DES hardware (See FIG. 4) were instantiated. When CCS signal is active the parallel blocks are stalled by disabling the $CLK_{DES}$ clock. This disabling can be done separately for each individual DES hardware block. In this way a better scaled switching activity control is obtained.

Figure 9:
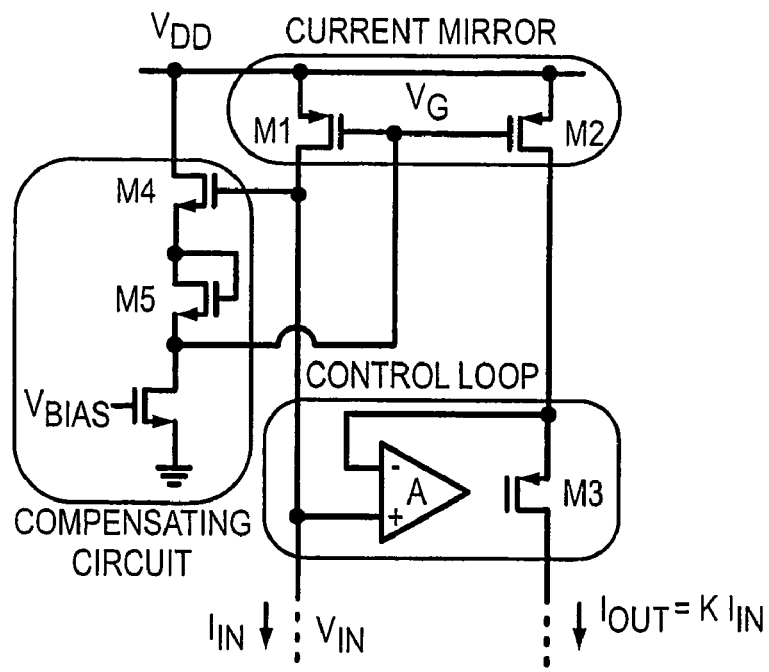
FIG. 9 is a schematic diagram of a current sensor for use in a system in accordance with an embodiment of an aspect of the invention.

Referring to FIG. 9, an example current sensor is shown with high accuracy that reduces voltage drop in the power line while providing high linearity and wide range with low power dissipation. Transistors M1 and M2 are mirror transistors. The $V_{GS}$ of transistors M4 and M5 compensates the $V_{GS}$ of transistor M1 so that the voltage drop caused by M1 in the power line only depends on its $V_{DS}$. A closed-loop feedback based on an op-amp has been added to keep the drains of the mirror transistors at the same voltage. The error between op-amp inputs due to its finite gain causes mismatching between the drain voltages of M1 and M2. In order to have a high accuracy current measurement, this error should be small compared to $V_{DS}$ of mirror transistors. To estimate the minimum gain required for the op-amp, the following formula may be used for calculating this error:

$$\epsilon=(V_+ - V_-)=(V_- - V_{SG3} - V_{DD}/2)/A$$

where $\epsilon$ is the error due to the finite gain, $V_{SG3}$ is the source-gate voltage of M3, $V_+$ and $V_-$ are the voltage at the positive and negative input terminals of the op-amp respectively, A is the op-amp gain and $V_{DD}/2$ represents the common mode voltage at the output of the op-amp. As the maximum value of $V_-$ is equal to $V_{DD}$ and the minimum value of $V_{SG3}$ is around 0.7 V (this transistor is always kept in saturation), the maximum value of the numerator is around 0.2 V and an op-amp gain greater or equal to 100 will provide a negligible input error.

Figure 10:
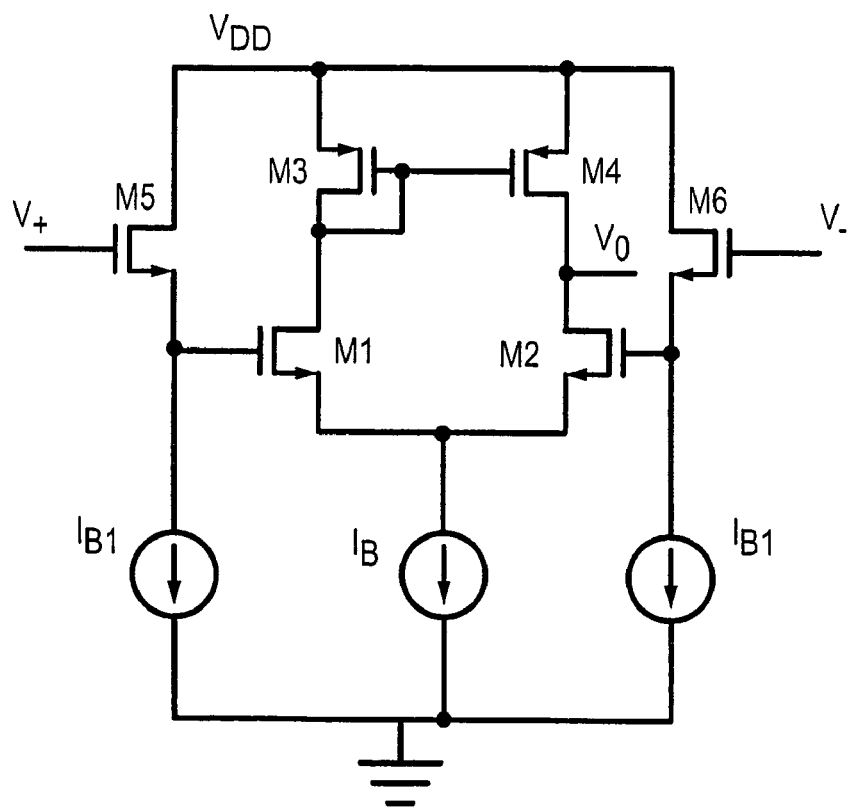
FIG. 10 is a schematic diagram of a single-stage op-amp with level shifters for use in the current sensor of FIG. 9.

Referring to FIG. 10, for implementing the op-amp, a single-stage configuration with n-channel MOS input transistors has been used. This configuration has two level shifters at its inputs (i.e. transistors M5 and M6 that ensure appropriate operation of the op-amp even when the mirror transistors work in triode region. Since $V_{GS}$ and $V_{DS}$ of mirror transistors are always the same and the current mirror is not affected by different loads, the current copying is always done precisely, even if the mirror transistors work in triode region. The current sensor provides wide range sensing and does not insert extra current in the signal path.

For reducing power consumption, the size of mirror transistors may be chosen in such a way that the mirrored current ($I_{OUT}$) is 1/20 of the CUT current.

Referring to FIGS. 11-14, simulation results for the example current sensor are provided. The proposed circuit was designed in 0.18 μm CMOS technology and 1.8 V supply. The linearity of the circuit response was studied.

Figure 11:
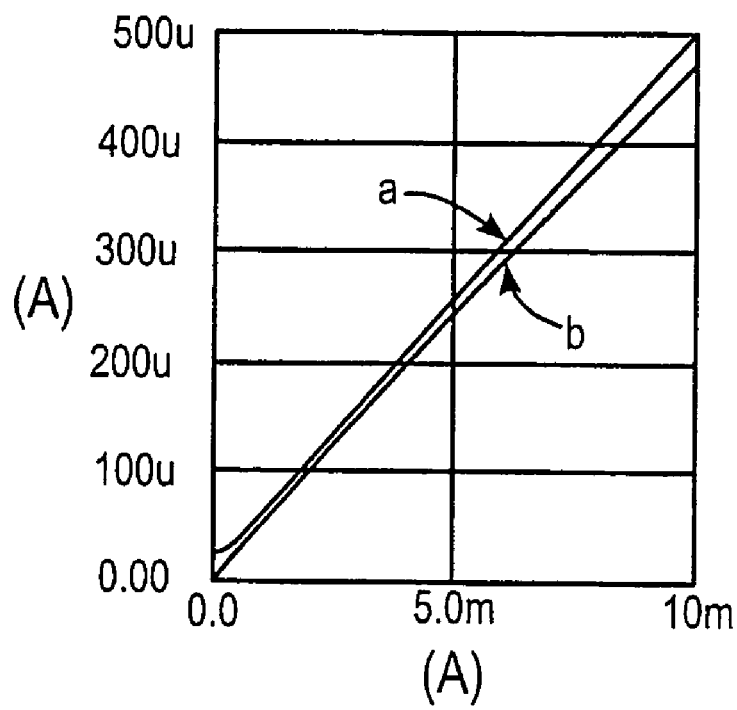
FIG. 11 is a graphic illustration of example current sensor output versus input current for the current sensor of FIG. 9.

Referring to FIG. 11 improvement in the sensor linearity over a conventional current mirror due to the control loop is shown: curve (a), characteristics of the proposed sensor, shows less than 2% error over an input range of 0.5 to 10 mA, while curve (b), characteristics of a conventional current mirror, has more than 10% linearity error.

As mentioned before, low voltage drop across the sensor is desirable for cryptosystems applications. By keeping the mirror transistors mainly in triode region guarantees that the desired current range is attained while the voltage drop across the current sensors remains in an acceptable range. Since the equivalent resistance of the transistor in triode region is proportional to W/L, by changing the size of current mirror transistors the resistance will change and can be reduced so that we have a wider range with the same voltage drop.

Figure 12:
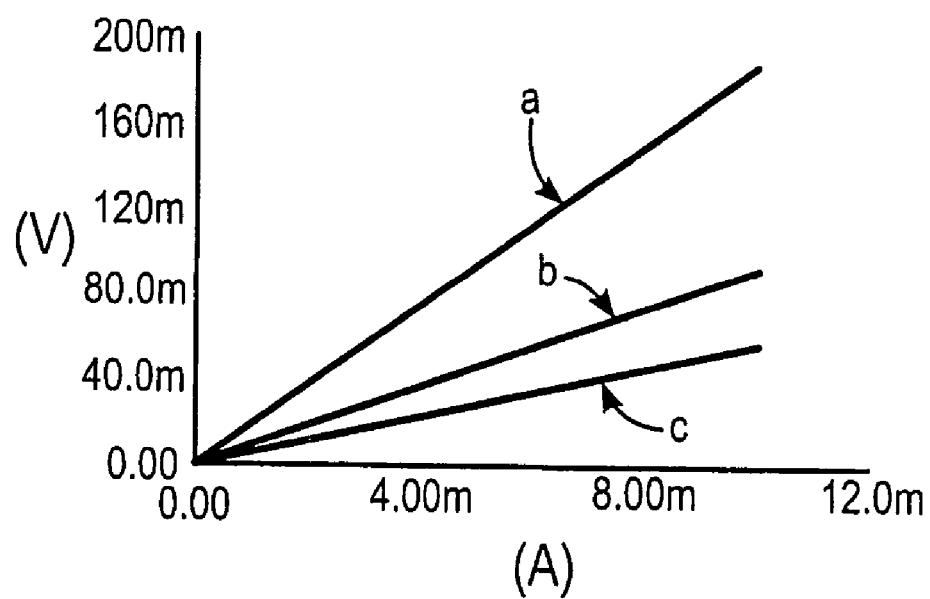
FIG. 12 is a graphic illustration of example voltage drop introduced by the sensor as a function of IIN for the following channel width of M1: (a) $W_{M1}=150\,\mu m$, (b) $W_{M1}=300\,\mu m$, (c) $W_{M1}=500\,\mu m$. for the current sensor of FIG. 9.

Referring to FIG. 12, the $V_{DS}$ of transistor M1 versus the current for various values of W/L is shown. The slopes of the curves represent the resistance of the transistor.

Figure 13:
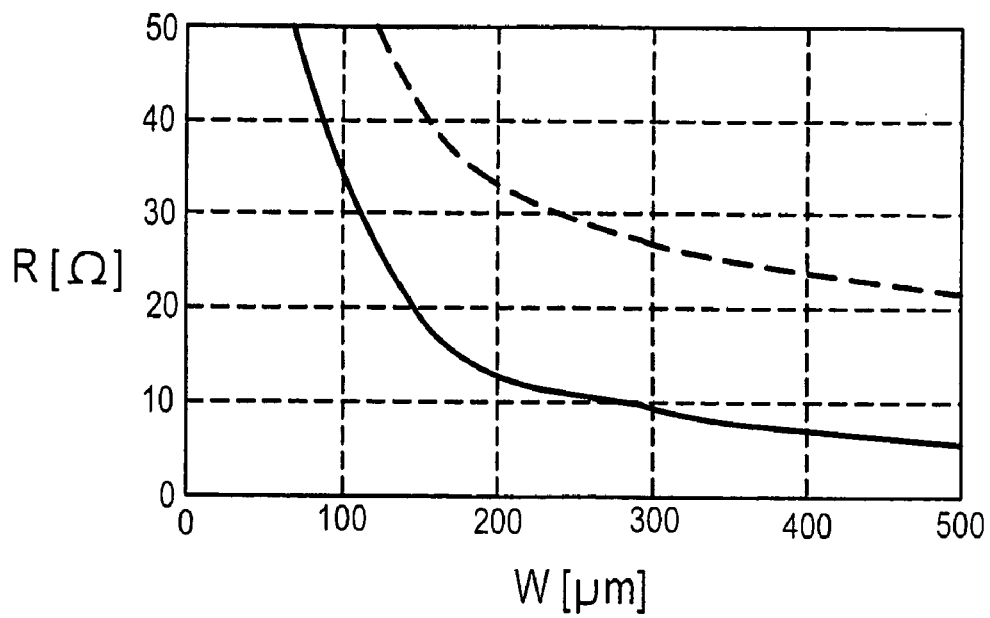
FIG. 13 is a graphic illustration of example equivalent sensor resistance for different width of M1 for the current sensor of FIG. 9 and a corresponding small signal resistance for a conventional current mirror.

Referring to FIG. 13, the equivalent sensor resistance for different width of the mirroring transistor (M1) is shown. It is clear that the relationship is approximately linear for W>200 μm while for W<200 μm the transistor enters the saturation region. The dashed curve shows the corresponding small signal resistance for the conventional current mirror at $I_{IN}$=5 mA.

Figure 14:
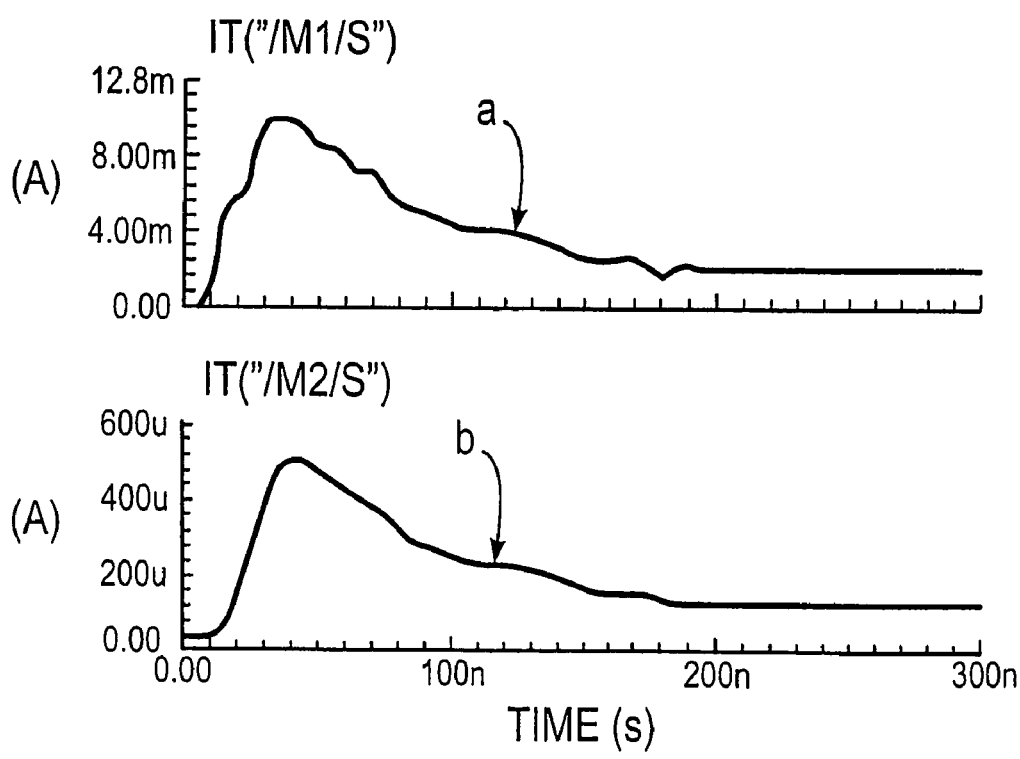
FIG. 14 is a graphic illustration of example (a) Input current ($I_{IN}$) and (b) output current ($I_{OUT}$) for the current sensor of FIG. 9 when emulating supply current of a microprocessor performing a cryptographic algorithm.

Referring to FIG. 14, the performance of the current sensor when it is used in measuring the current of a microprocessor performing a cryptographic algorithm is shown. The waveform (a) and (b) are input and output current respectively. It can be seen that the output follows the input smoothly while the input current changes from 0 to 10 mA.

Figure 15:
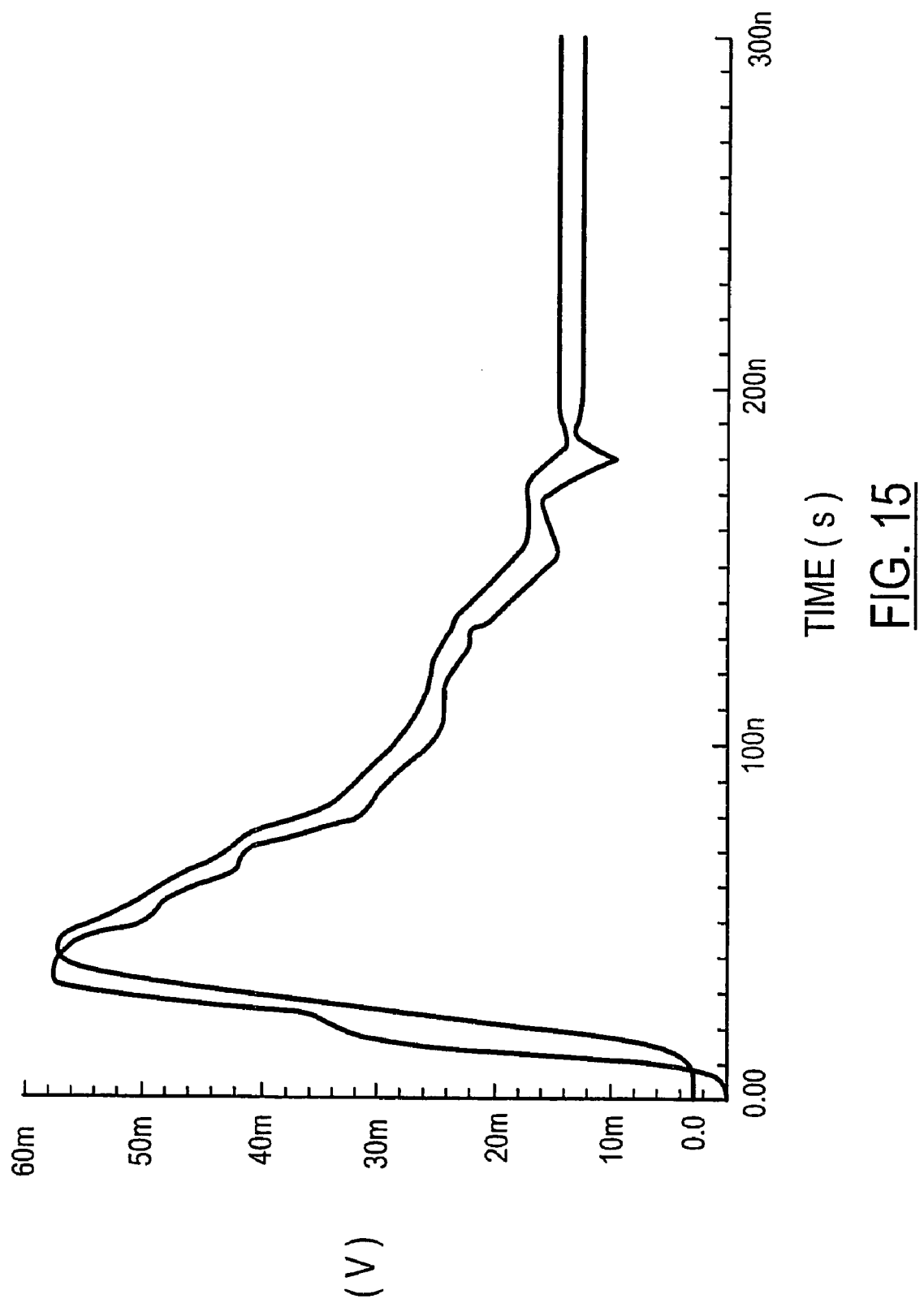
FIG. 15 is a graphic illustration of example voltage drops across current mirror transistors in the current sensor of FIG. 9 when emulating microprocessor performance.

Referring to FIG. 15, the changes of the $V_{DS}$ voltage of M1 and M2 are shown and one can see that the op-amp is able to force these two $V_{DS}$ voltages to approximately the same value. The voltage loss across the current sensor is less than 60 mV for 10 mA current. In other words, the supply voltage of the microprocessor will not go below 1.74 V.

The static power dissipation is 270 μW. Additionally, 5% of the measured current will be consumed in the mirroring branch. There is a tradeoff between power consumption and the linearity of the circuit. For example, the sensor can also be designed with a two-stage op-amp with a higher gain. In that case the linearity may be above 99% however, the static power consumption may double.

Figure 16:
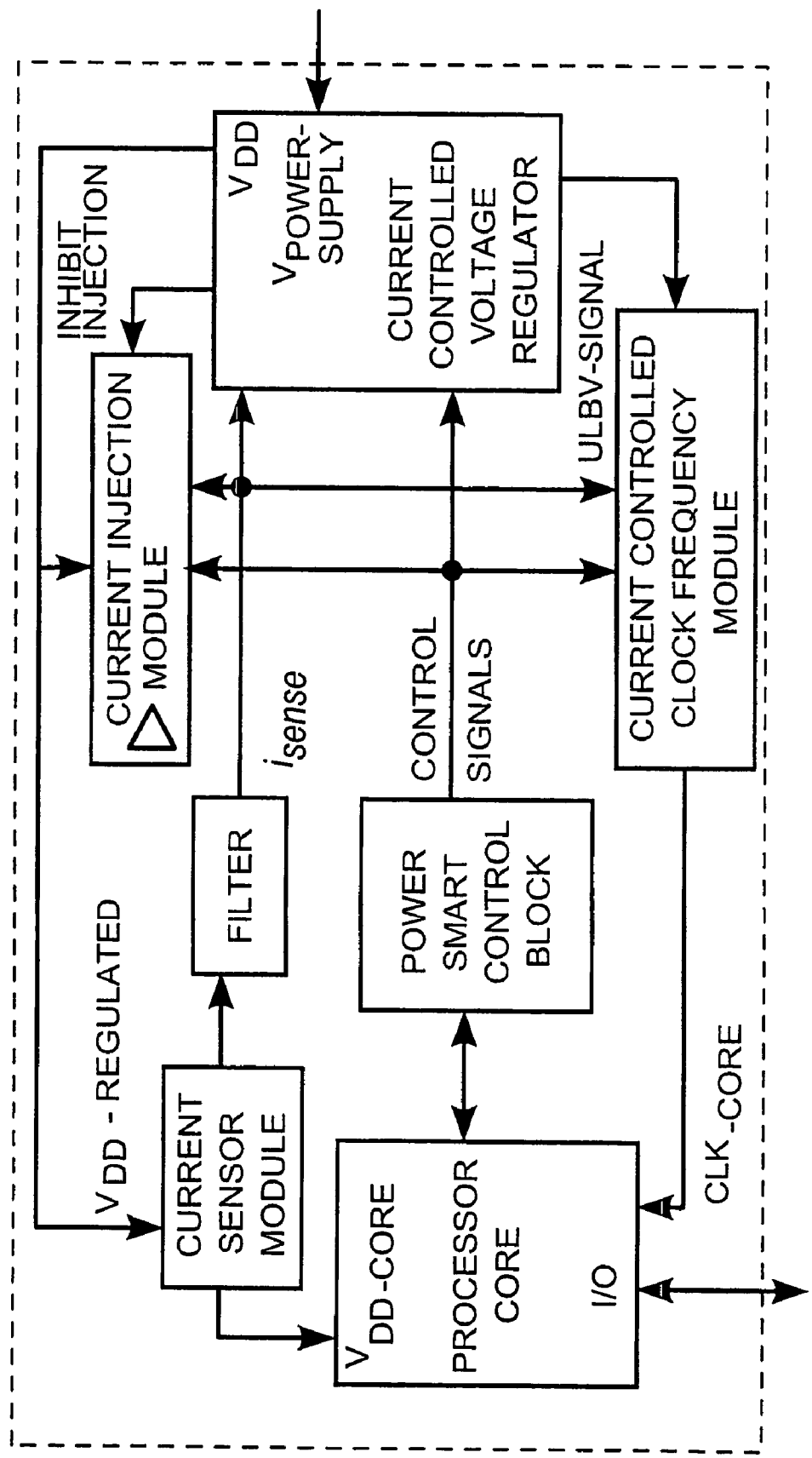
FIG. 16 is a block diagram of a system in accordance with an embodiment of an aspect of the present invention.

Referring to FIG. 16 and forward, a general architecture with current flattening employing voltage and clock scaling together with current injection is described. Many of the elements described above are used. As a result there may be some repetition in the description. Elements of the preceding description will apply to the following description, as will elements of the following description apply to the preceding description.

Reduction in voltage supply reduces the current levels within a CMOS circuit and results in quadratic power savings. The negative side of this approach to reducing current and power is that the delay of the CMOS gates scales as $1/V_{dd}$ (ignoring threshold voltage reduction in signal swing). As a result, by scaling the voltage, the delay through the critical paths of a digital circuit will increase and the functionality of the circuit can be compromised.

A total security proof system should show no data and program to current dependency at the system's attack point, which is normally the power supply point of the system. This is difficult to do and thus various software and hardware methods are used in order to increase the security of the system against power analysis attacks. Since power analysis attacks can use power, current, or voltage measurements, we propose to control both parameters of the power (current and voltage). The current consumption of the system is maintained at a fixed preprogrammed value while the voltage and the clock frequency of the system are scaled down in order to bring the current and the power levels under some reference values. In this way, a flat current waveform and a scaled down, uncorrelated voltage and power consumption are generated at the attacker's point. This allows for power savings at the same time as masking the power and the current to data dependency.

The state of a processor changes at every clock cycle. The switching activity within a CMOS synchronous circuit is initiated by the rising/falling edges of clock signals. Due to delays within the circuit paths the switching current of the processor's circuits happens at various times within the clock cycle period. In order to maintain the system's current to a fixed $I_{ref}$ value (and mask the current to data dependency at the system level) a fast analog current injection and current controlled voltage regulator modules can be used.

From this point forward in this description, as an example, it is assumed that the processor core can run at a nominal frequency $f_{nom}$ (lower than the maximum designed frequency) within a voltage supply range [$V_{nom-low}$, $V_{nom}$] called a safe voltage range (SVR). This voltage range can be used to safely reduce the current and the power consumption of the processor to some lower levels than the ones generated by the nominal voltage supply $V_{nom}$. If the current and the power requirements of a system cannot be met by scaling the voltage within the SVR, then the voltage and the frequency of the processor must be scaled together. Another voltage range for the processor core, where the clock frequency must be scaled in order to reduce the voltage and maintain the processor operational, will be called a reduced voltage range (RVR) and is defined by [$V_{min}$, $V_{nom-low}$], where $V_{min}$ represents the minimum designed voltage supply of the processor. If the required current and power level cannot be met by the above techniques, then other system techniques such as reducing the switching activity of the processor can be used. In this example it is assumed that the current and power consumption levels can be met solely by voltage and clock scaling.

Referring to FIG. 16, a general block diagram of a system architecture that supports current flattening at the system level by using voltage and clock scaling together with an analog current injection technique is shown. The architecture allows for the masking of current to data dependency of a cryptosystem by keeping the voltage and the total current consumption at the power supply pin $V_{power-supply}$ substantially constant. The current consumption of the system is maintained to a constant level $I_{ref}$ by a combination of voltage/clock scaling and current injection activities within the internal circuitry of the system-on-chip. The architecture has the following modules: processor core, current sensor, filter, analog current injection, power-smart control, current control voltage regulator, and current controlled clock frequency.

The processor core may be a low-power processor core such as ARM7TDMI that can be used for developing systemon-chip designs. The processor core is equipped with voltage and clock scaling features. The current sensor module is an integrated current sensor that provides real-time measurements of the supply current to the system. This current sensor is based on a wide-range low-power current mirror circuit. The filter module filters the current signal and generates the $i_{sense}$ signal. The $i_{sense}$ signal is used by the other current blocks in the system.

The power-smart control block can be used to provide an interface to control the activity of the current injection, voltage regulator, and clock frequency modules. A digital reference current value can be loaded into this block by the processor core. This current value is converted into an analog reference signal called $I_{ref}$ that is compared to the $i_{sense}$ signal in the current controlled voltage regulator in the implementation shown. The power-smart control block can be used to change the setting of $I_{ref}$ as desired by the processor core. $I_{ref}$ could alternatively be provided by alternative current generators in place of a power-smart control block. The result of this comparison is used in the current injection module, the current controlled voltage regulator, and the current controlled clock frequency module. The control block is also responsible for generating various enable and control signals for the other current modules. For example, the processor core can enable or disable respective current modules as desired through the power-smart control block.

The power-smart control block can be implemented to accept input from an external power management system such that the current modules and other elements of the system can be enabled or disabled in response to an external power management system. For example, the system may have bypass, operating, and sleep modes. In bypass mode the processor core or the external power management system can instruct the power-smart control block to disable the other non-processor elements of the system when current flattening is not to be used (for example, when cryptography is not used). In operating mode current flattening could be implemented as discussed herein. When in sleep mode both the processor and non-processor elements could be disabled to save power, for example, in a multiprocessor implementation when the cryptographic core is not being used.

The current controlled voltage regulator is used to scale down the power supply of the chip and bring it to the $V_{DD\text{-}regulated}$ level in order to reduce the current consumption of the system to $I_{ref}$. As long as the current is above the $I_{ref}$ level the voltage is reduced dynamically to lower values. When $V_{low\text{-}nom}$ value is reached the functionality of the processor core is compromised (due to increased delays) and a control signal called under-low-bound voltage (ULBV) is generated. The current control clock frequency is responsible for scaling down the clock frequency when the ULBV signal is active. However, when the ULBV signal is not active the clock frequency is maintained at the fixed nominal value $f_{nom}$. In order to reduce $V_{DD\text{-}regulated}$ under $V_{low\text{-}nom}$ the clock frequency must be reduced accordingly to compensate for the increased delays. The current injection module is an analog circuit that is capable of injecting extra current into the system when the current sensed signal $I_{sense}$ is less than $I_{ref}$. The injection module and the current controlled voltage regulator module are functionally exclusive.

Figure 17:
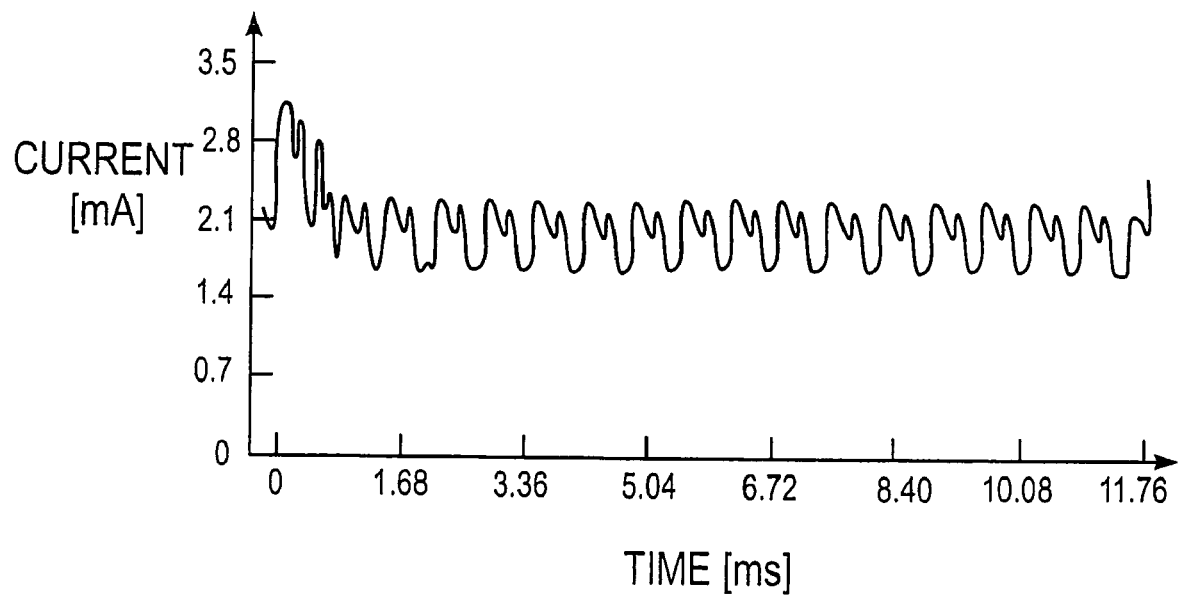
FIG. 17 is a graphic illustration of current for a DES application executed on an example processor core in the architecture of FIG. 16.
Figure 18:
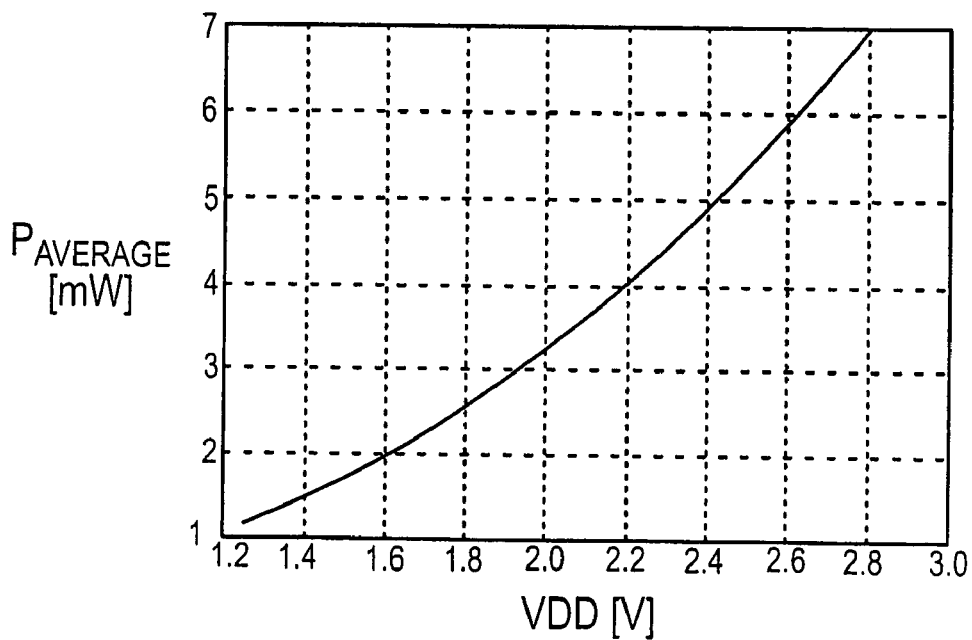
FIG. 18 is a graphic illustration of average power versus VDD for a DES application executed on an example processor core in the architecture of FIG. 16.

Referring to FIGS. 17 and 18, two sets of example results are shown. In FIG. 17, current and power measurements for an ARM7TDMI processor core executing an encryption operation on a 64-bit string are shown. For this example, the encryption uses the well-known Data Encryption Standard (DES) algorithm. In FIG. 18, circuit level simulation results for the architecture model using SPICE are shown.

The processor's frequency of operation for the experiments was 50 MHz. In FIG. 17, the current waveform is collected at the power supply pin of the ARM7TDMI processor core.

Table 1 summarizes the current and power measurements obtained for two DES implementations (32-bit and 16-bit) at various power supply values. The ARM7TDMI processor provides a 32- and a 16-bit instruction set architecture. The 16-bit instruction set is a compressed set sometimes referred to as the Thumb instruction set. The 16-bit implementation provides lower power consumption due to the reduced switching activity of the processor. However, the implementation using 16-bit instruction set is longer.

By analyzing the 32-bit measurements results of Table 1 the followings reductions at every 0.2 V decrease in the power supply can be observed: 21.4% for the average power, 12% for the maximum current, and 11.3% for the current variation. The maximum current consumption is reduced by 0.29 mA and the current variation by 0.13 mA, at every 0.2 V reductions in power supply. Also, from the Table 1 results the following reductions due to the use of the Thumb implementation (reduced switching) can be observed: 5.4% for the average power, 15.5% for the maximum current, and 27% for the current variation.

It was determined that at 50 MHz frequency the SVR for the ARM7TDMI processor core was [1.3V, 2.5V]. In FIG. 18, a plot is presented for the average power versus $V_{dd}$ that was derived from the current measurements performed for the ARM7TDMI processor core executing the DES encryption. From these results, it can be seen that the current values and the current variation levels within an ARM7TDMI processor core can be reduced by voltage scaling and by reducing the switching activity of the processor.

TABLE 1

Data analysis; ARM7TDMI executing DES; 50 MHz.

| Vdd [V] | Pavg 32 bit [mW] | Pavg 16 bit [mW] | Imax 32 bit [mA] | Imax 16 bit [mA] | Pk—Pk 32 bit [mA] | Pk—Pk 16 bit [mA] |
|---|---|---|---|---|---|---|
| 2.5 | 5.369 | 5.123 | 3.25 | 2.78 | 1.48 | 1.10 |
| 2.3 | 4.453 | 4.240 | 2.95 | 2.51 | 1.36 | 1.00 |
| 2.1 | 3.619 | 3.460 | 2.65 | 2.24 | 1.23 | 0.89 |
| 1.9 | 2.893 | 2.757 | 2.34 | 1.97 | 1.10 | 0.79 |
| 1.7 | 2.261 | 2.116 | 2.05 | 1.73 | 0.96 | 0.70 |
| 1.5 | 1.721 | 1.604 | 1.77 | 1.49 | 0.84 | 0.61 |
| 1.3 | 1.260 | 1.190 | 1.51 | 1.26 | 0.72 | 0.53 |

Figure 19:
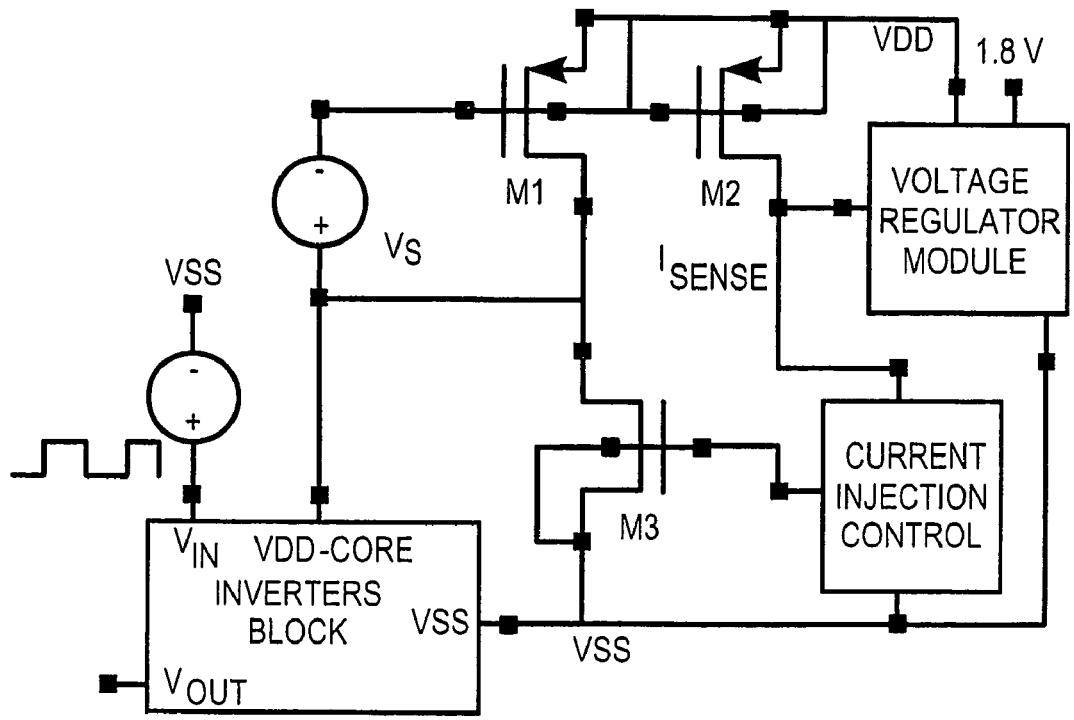
FIG. 19 is an example simulation circuit for simulation testing of the system of FIG. 16.

Referring to FIG. 19, a circuit used to model the functionality of the architecture of FIG. 16 is shown. The circuit was designed using 0.18 μm CMOS technology. The detailed implementation of the voltage regulator module, current injection control module, and the inverters block is not shown. In this model circuit, the processor core was modeled by a chain of oversized inverters. The size of the inverters and the RC capacitances between the inverters was chosen such that the maximum current at 1.8 V was less than 5 mA and the current variation follows the shape of the DES implementation but at a much faster rate. Within a complex processor the various modules are connected together and there are delays between signals propagating from one module to another. The chain of inverters was intended to emulate these delays. The current sensor of the system is implemented by a pair of transistors M1 and M2 representing a current mirror circuit. These transistors are sized for wide current range (such as 0 mA to 30 mA) measurement. The current injection circuit is composed of an nMOS transistor, M3. The current through the nMOS transistor is a function of the $i_{sense}$ measurement and is controlled by a current injection control module.

Figure 20:
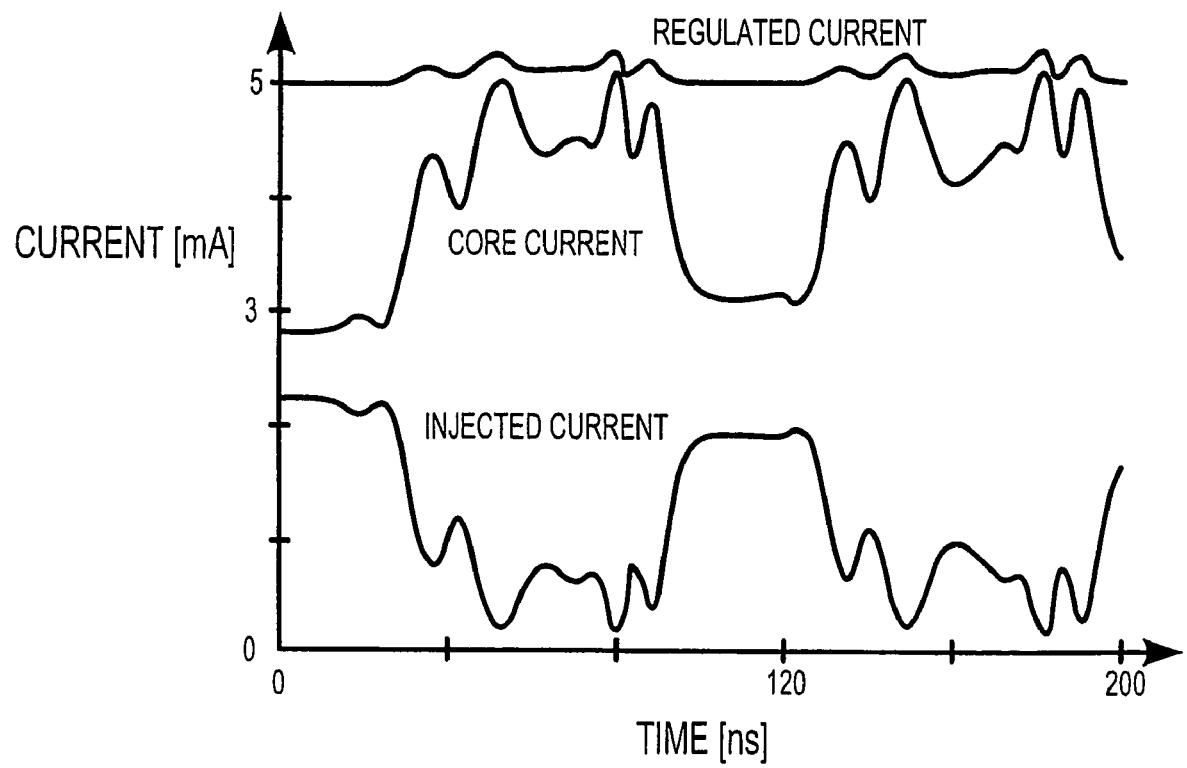
FIG. 20 is a graphic illustration of simulation results from the environment of FIG. 17.

Referring to FIG. 20, current simulation results are shown that were obtained when the regulated current was fixed at 5 mA. In this case only the current injection module was active, the voltage regulator module generated the maximum supply voltage $V_{nom}$=1.8 V. The top plot is if the total regulated current of the system (seen at the power supply pin), while the middle plot is the core current (modeled by the inverters), and the lower plot is the injected current through M3.

Figure 21:
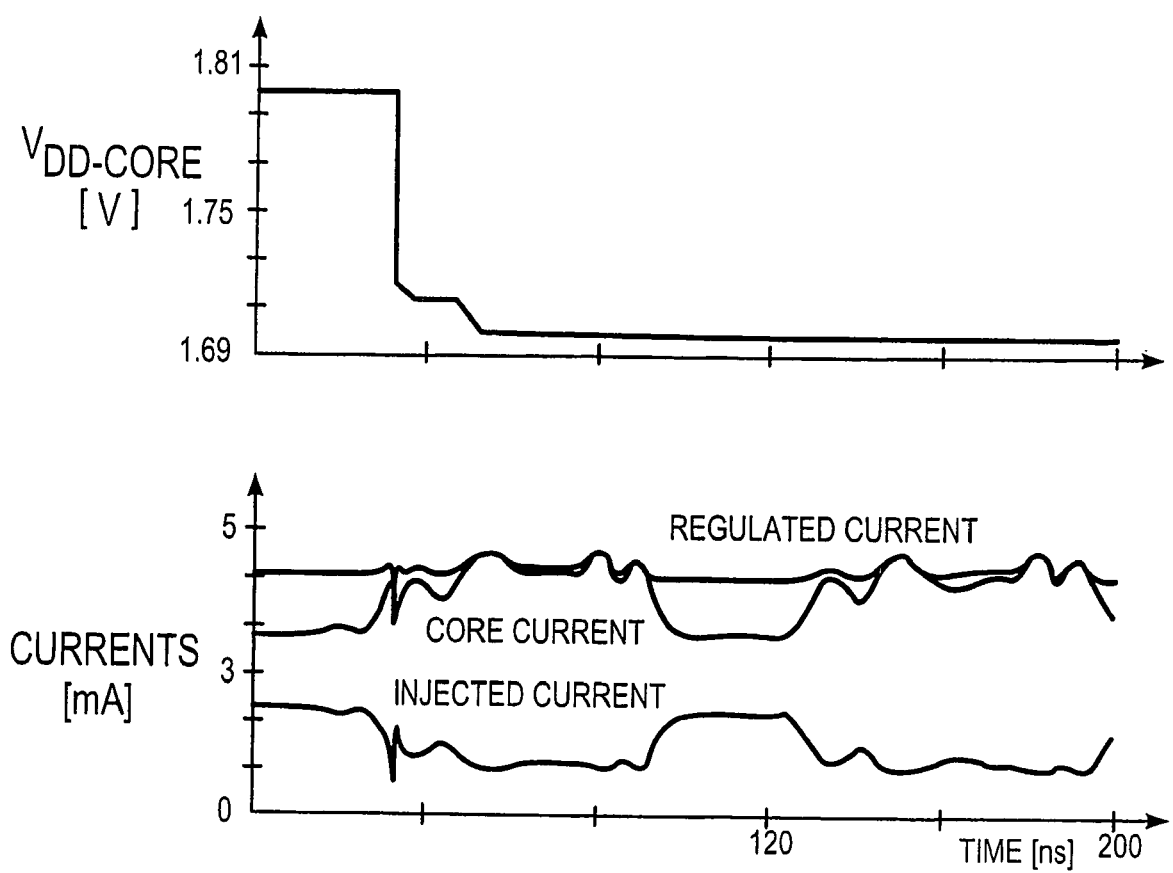
FIG. 21 is a graphic illustration of simulation results from the environment of FIG. 17.

Referring to FIG. 21, the currents (at the bottom) and the regulated voltage (at the top) of the system when the $I_{ref}$=4 mA are shown. In this case, the core current of FIG. 20 should be regulated at 4 mA for the reasons discussed previously. As can be seen from FIG. 20, the core current has some intervals where it exceeds 4 mA. As soon as the $I_{sense}$ passes the $I_{ref}$ level, the voltage regulator module is enabled and the current injection module is disabled. The core voltage is dynamically reduced along the rising edge of the current peak P1. Consequently, the current is reduced until the maximum current of the peak P1 is equal to $I_{ref}$. For the next stage the supply voltage is kept at this low level. Due to the voltage supply the reduction, the current of the falling edge of the peak P1 is less than $I_{ref}$ level. As a result, the current injection module is reactivated. The voltage regulator module is activated again when $I_{sense}$>$I_{ref}$. Table 2 summarizes the current and power measurements for these simulations ($I_{ref}$=5 mA, $I_{ref}$=4 mA). When $I_{ref}$ was set at 5 mA (above the maximum core current at 1.8V) the system current variation was reduced by 87% and the extra power consumed to mask the side-channel attacks represents 21.6% of the total system power. When the $I_{ref}$ was set to 4 mA (under the maximum core current at 1.8 V) the current variation was reduced by 70% and the extra power consumed to mask the side-channel attacks represents 12% of the total power of the system.

TABLE 2

Data analysis for the simulation circuitry

| Current | Iref [mA] | Iavg [µs] | Min [mA] | Max [mA] | Pavg [mA] |
|---|---|---|---|---|---|
| Isystem | 5 | 5.084 | 4.980 | 5.280 | 9.151 |
| Icore | 5 | 3.983 | 2.782 | 5.075 | 7.169 |
| Iinjected | 5 | 1.101 | 1.793 | 2.200 | 1.981 |
| Isystem | 4 | 4.220 | 4.035 | 4.590 | 7.243 |
| Icore | 4 | 3.722 | 2.785 | 4.624 | 6.377 |
| Iinjected | 4 | 0.498 | 0.008 | 1.280 | 0.866 |

Figure 22:
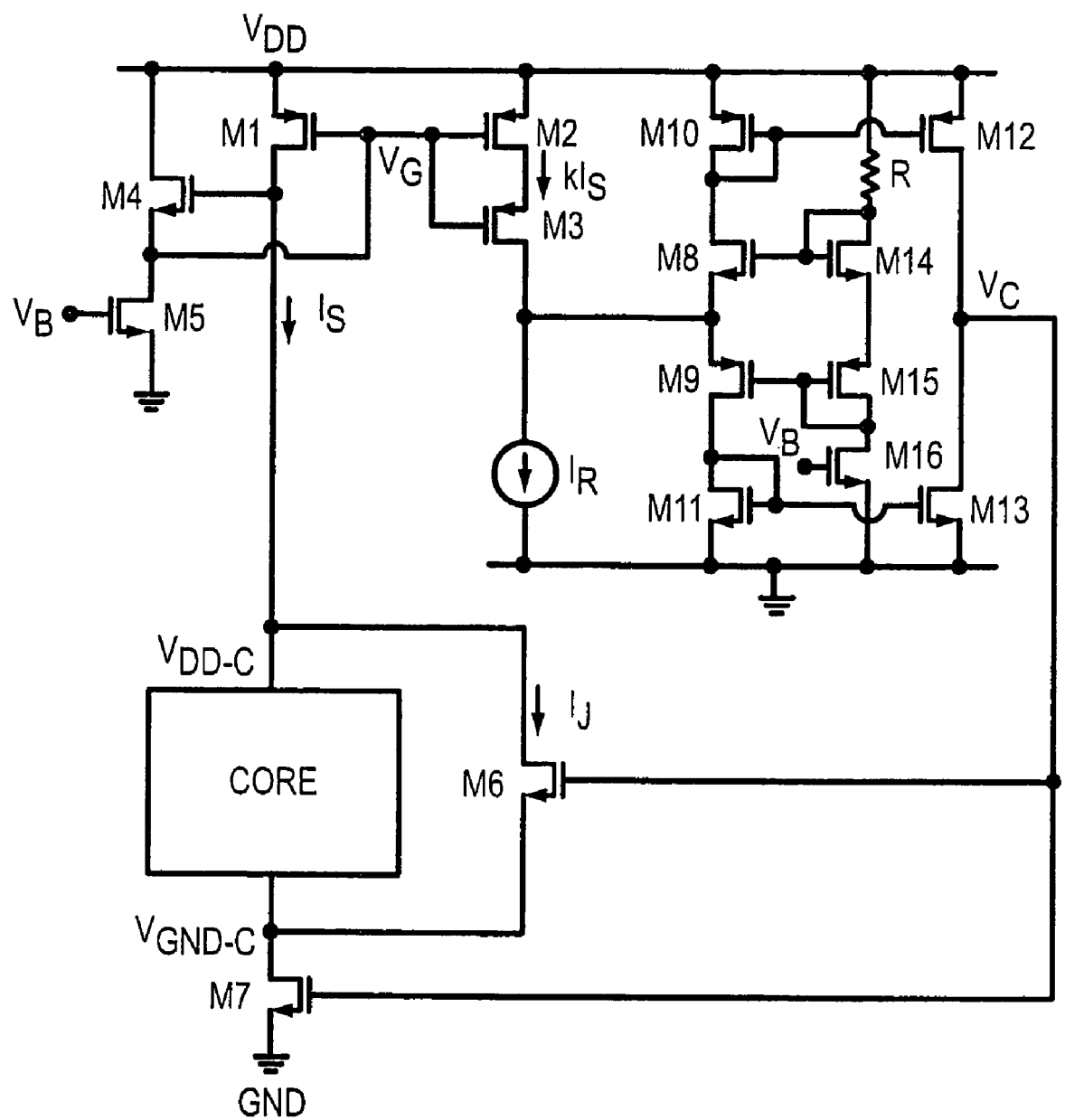
FIG. 22 is a detailed schematic diagram of an example system in accordance with an embodiment of an aspect of the present invention.

Referring to FIG. 22, a detailed schematic diagram of an example system circuit is shown.

The current sensor is a modified current mirror (transistors M1 and M2), which can reproduce the current of the processor core model. This method is reliable and highly sensitive, because the mirroring ratio of the current depends exclusively on the mirror transistors ratio. However, this method has two drawbacks. First the insertion of the current mirroring transistor (M1) in the supply line adds a voltage drop equal to the |VGS| of transistor M1 and secondly, since the processor core presents variable impedance to the current sensor, the load difference in the two current mirror branches may cause inaccuracy in mirroring the current. These two problems have been addressed in the proposed current sensor by using a level shifter (M4) at the input branch of the current sensor and a cascaded transistor (M3) at the output branch: M4 compensates the |VGS| of M1, so that the voltage drop across M1 is reduced, and M3 helps the drain voltage of M2 track the drain voltage of M1 and mirroring precision is increased. This configuration is fast in following the changes of the current. For limiting the power consumption, the sizes of M1 and M2 are chosen in such a way that the mirror current in M2 and M3 is k $I_S$, where k is a factor chosen to limit the power consumption, for example, in the simulation discussed herein k=1/20. For discussions on how M1 and M2 may be chosen to meet this requirement see for example S. S. Rajput, S. S. Jamuar, "Low voltage, low power, high performance current mirror for portable analogue and mixed mode applications," Proc. IEE Circuits Devices Syst., October 2001, Vol. 148, No. 5, pp. 273-278, and H. Vahedi, R. Muresan, S. Gregori, "Low-voltage wide-range built-in current sensing for system-on-chip applications," Proc. IEEE Int. Midwest Symp. Circuits and Systems, August 2005, pp. 843-846. The content of the above references is hereby incorporated by reference into this detailed description.

The difference between k$I_S$ (the attenuated version of the measured current) and $I_R$ (the attenuated version of the reference current) is injected into a transimpedance amplifier (M8-M16), such as those described in O. Khouri, A. Cabrini, S. Gregori, R. Micheloni, G. Torelli, "Voltage mode closed-loop sense amplifier for multilevel flash memories," Proc. European Conf. Circuits Theory and Design, September 2003, pp. 109-112. The context of the above references is hereby incorporated by reference into this detailed description. The transimpedance amplifier provides the current control as part of the current control voltage regulator of FIG. 16. The transimpedance amplifier also provides current control for the current injection module and the voltage regulator discussed below. The source terminal of M8 (and M9) is a low-impedance node, therefore, the injected current makes the current through transistor M8 different from the current through transistor M9. These two currents are mirrored and amplified in the right branch of the amplifier (M12 and M13) and converted to the voltage Vc. This output voltage, Vc, represents the control signal used for controlling the Current Injection and Voltage Regulation blocks described below. M14, M15, M16 provide a network to bias the amplifier.

Transistor M6 implements the function of current injection. M6 (for the simulations discussed herein, W/L=300/0.18) is a part of a closed control loop: when the current of the core decreases, the control signal, Vc, increases and, therefore, M6 carries more current. The additional current (Ij) compensates processor (core) current changes and therefore the current seen at the supply pin, Is, remains close to the chosen reference level. For implementing programmability, M6 may be laid out with parallel transistors. The number of transistors and therefore the size of M6 can then be selected with a decoder so that the circuit covers different ranges of current.

Transistor M7 (for the simulations discussed herein, W/L=250/0.18) $I_{ref}$=$I_R$/k acts as a voltage regulator under control of the transimpedance amplifier: when the current of the processor increases, Vc decreases, the voltage drop across M7 increases and in turn the voltage across the Core (Vdd-c−Vgnd-c) is decreased. This causes a reduction in the core current and hence, Is the current at the supply pin is kept close to the reference current. For adding programmability, M7 may be laid out as parallel devices. A decoder digitally can then select the number of transistors, and hence the size of M7, so that the circuit can cover different ranges of current.

Alternatively, the processor (core) voltage regulator can be placed in the VDD path between $V_{dd-c}$ and the current sensor such that $I_s$ flows through the voltage regulator. This can reduce the complexity of connecting the voltage regulator to the core.

The filter power-smart control block and current controlled block frequency module of FIG. 16 could be added to the basic detailed circuit of FIG. 22 as desired. Similarly, circuits can be implemented without the current controlled voltage regulation as set out if desired, provided that the transimpedance amplifier, or alternative, functions are retained for control of current injection.

Figure 23:
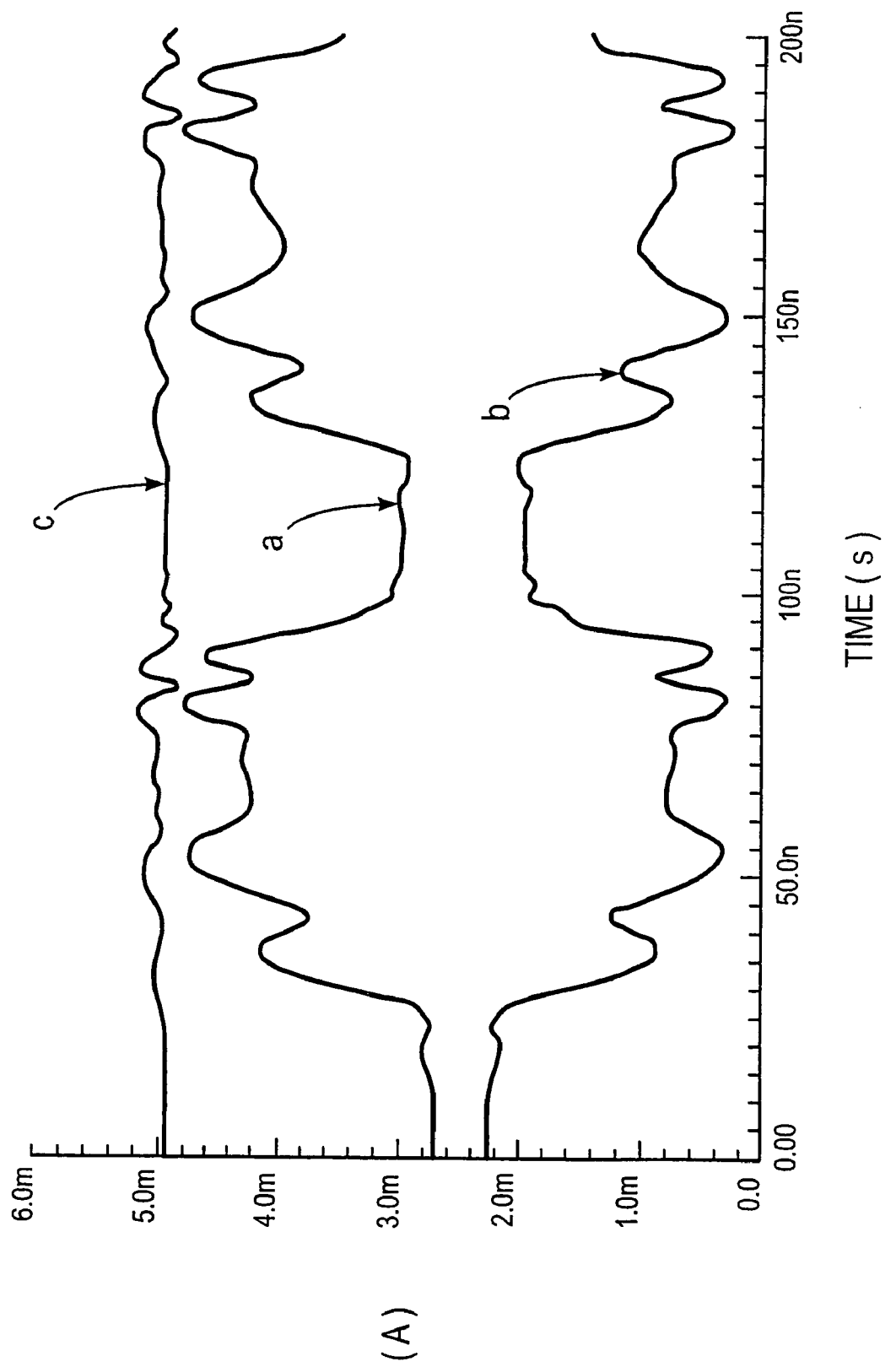
FIG. 23 is a graph of a simulation using the system of FIG. 22 with current injection.

The circuit of FIG. 22 has been simulated using Cadence™ tools. Referring to FIG. 23, the simulation result considering only the current injection block is shown. The circuit of FIG. 22 has also been manufactured using TSMC CMOSp18 technology. The result shows the injected current, curve 'b', compensates the variations of the current of the core, curve 'a'. The combined result is curve 'c', which is flattened around Iref=5 mA. The maximum deviation from the average current is 297 µA.

Figure 24:
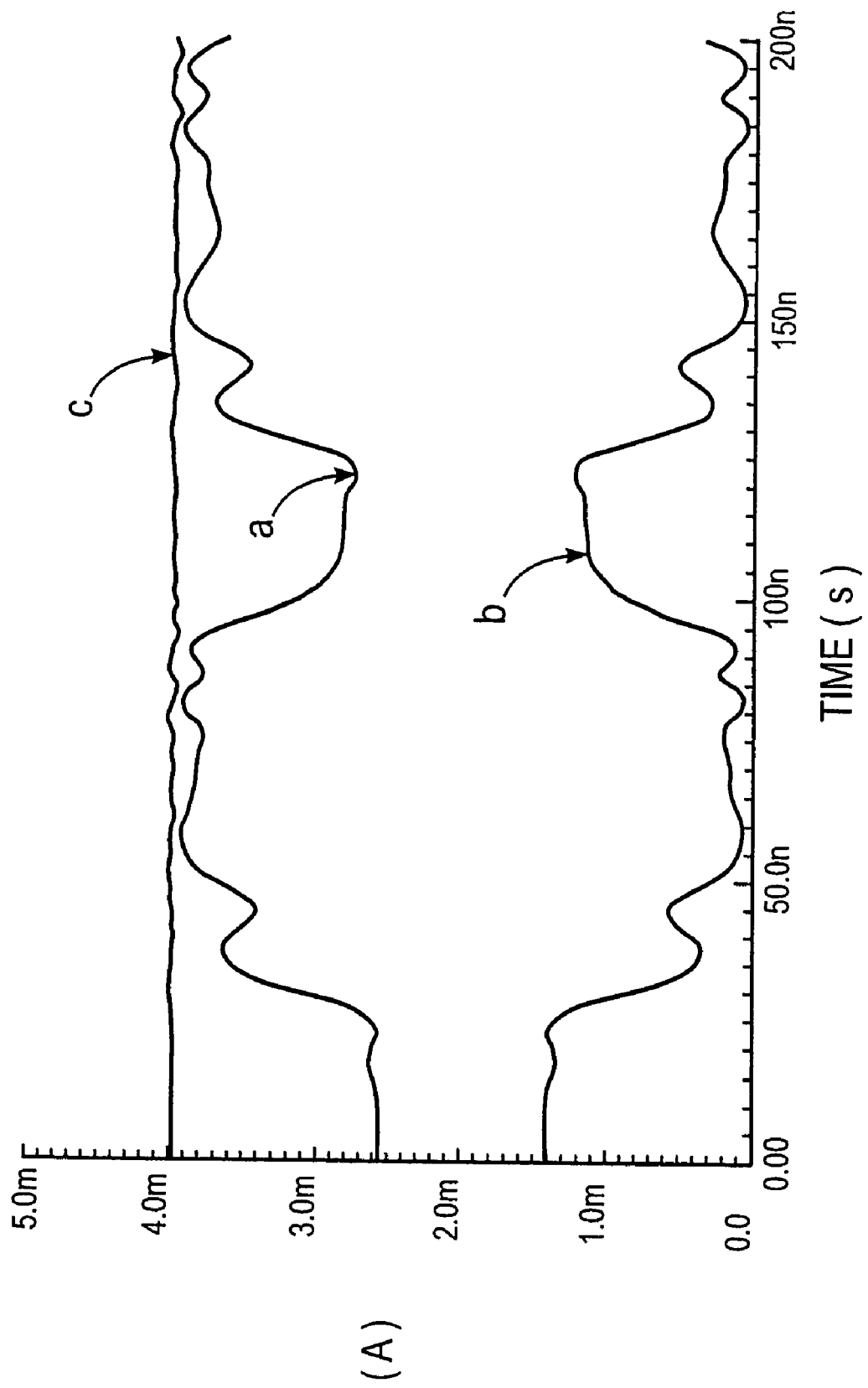
FIG. 24 is a graph of a simulation using the system of FIG. 22 with current injection and voltage regulation.

Referring to FIG. 24, a similar simulation has been done using both current injection and voltage regulation. By regulating the voltage, the flattened current (curve 'c') can be attained with a lower current reference, Iref=4 mA. This means that by using voltage scaling, flattening can be done with lower power consumption overhead. Curve 'a' and curve 'b' are the current of the model processor (core) and the current of the injection block respectively. Also, the maximum deviation from the average current is 27 µA, which shows 20.8 dB attenuation compared to the situation with only current injection (FIG. 23).

Figure 25:
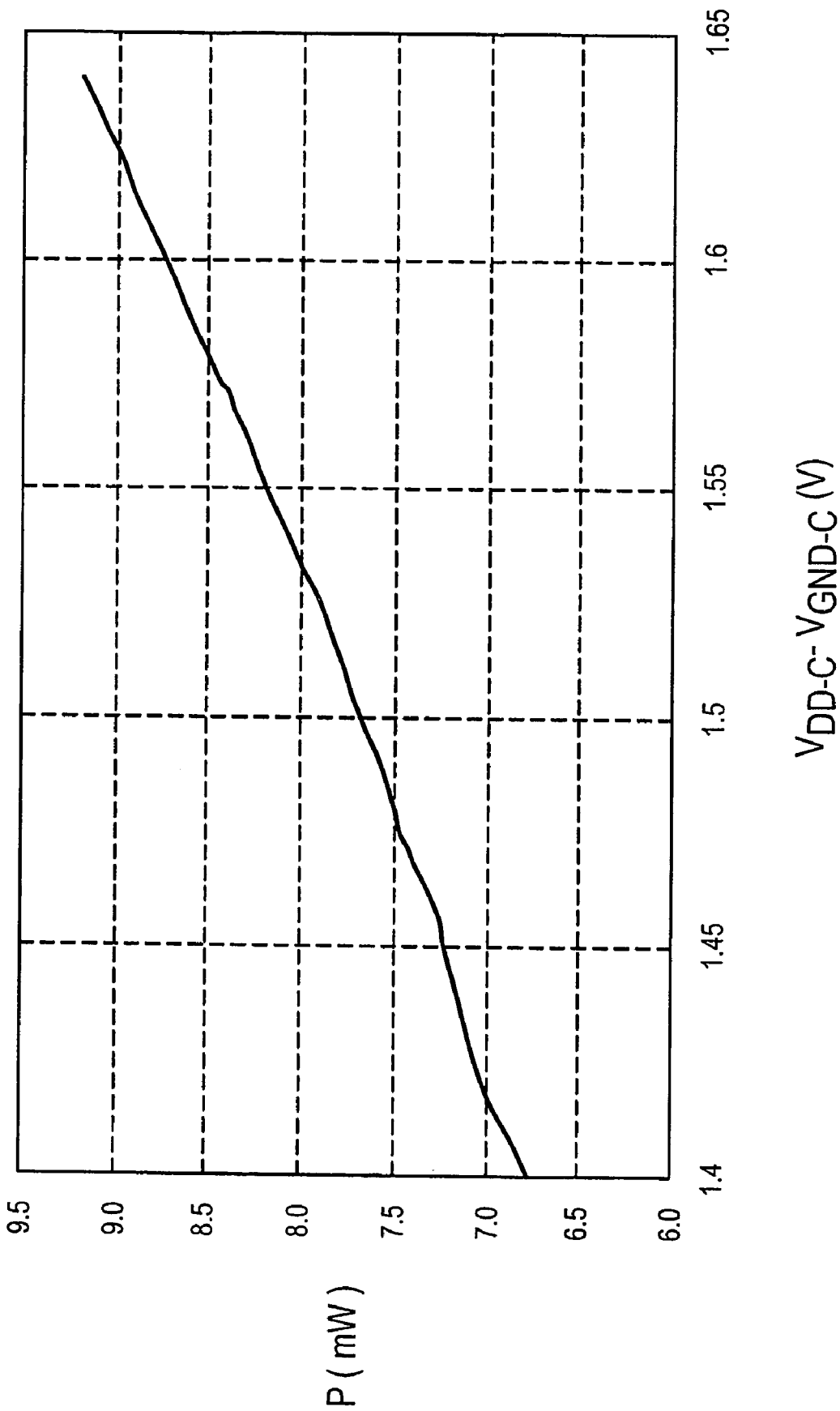
FIG. 25 is a graph of power consumption for varying processor supply voltages of a simulation using the system of FIG. 22.

Simulations have been repeated for different ranges of voltage scaling by changing the size of voltage regulating transistor (M7). In each situation the minimum supply voltage of the microprocessor core has been measured and the average power consumption of the system has been calculated. Referring to FIG. 25, the relationship between the minimum supply voltage of the processor and the average power consumption of the system is shown.

From FIG. 25 it is apparent that, if the supply voltage of the processor (core) is scaled down, the current flattening power consumption overhead is reduced. The amount that the voltage can be scaled down will be limited by resulting delay in operation of the processor (core), which may affect proper operation of the processor. Voltage reduction of the power consumption will generate delay in operation. However, as long as the processor (core) operates properly the delay may not be a problem.

It is to be recognised that the non-processor core elements of the system (together called a current flattening device as previously discussed herein) can be implemented on a chip separate from a processor core chip for system-on-package implementation where the two chips are connected such that access to connections between the chips is not possible during use. The various functions described herein for the system-on-chip would apply with consequent modifications for separate chip implementation. This would be particularly applicable to smart card applications. Separate implementation can allow the utilization of existing processor core chip solutions such that only a current flattening device need be newly implemented and adapted to the existing processor core chip.

It will be understood by those skilled in the art that this description is made with reference to the preferred embodiment and that it is possible to make other embodiments employing the principles of the invention which fall within its spirit and scope as defined by the following claims.

We claim:

1. A method of flattening the total current consumption of a system having a processing core and a power supply input, the method comprising:
    a) sensing, by means of a current sensor, an input current from within the system at the power supply input to the system and a feedback current from within the system at the processing core; and
    b) controlling, by means of a control, based on the sensed input current and feedback current, the current consumption of the system such that the current consumption of the system is reduced if over a reference current threshold, and increased if below a reference current threshold.

2. The method of claim 1 wherein current consumption at the power supply input is increased by means of an analog current controlled source.

3. The method of claim 2 wherein the controlled source is a wide MOS transistor controlled by an analog gate voltage.

4. The method of claim 1 wherein current consumption at the power supply input is increased by injecting additional current within the system through digital injections cells that work at higher frequencies than clock core frequency of the core.

5. The method of claim 4 wherein the injection current responds to the feedback current, wherein the feedback current indicates that the current consumption of the system is under a prescribed limit.

6. The method of claim 1 wherein current consumption at the power supply input is increased by increasing the switching activity of the system.

7. The method of claim 1 wherein current consumption at the power supply input is increased by increasing operating frequency of the processor core from within the system.

8. The method of claim 1 wherein current consumption at the power supply input is increased by increasing voltage supply to the processor core from within the system.

9. The method of claim 6 wherein the amount of increased switching activity is controlled based on the sensed input current.

10. The method of claim 1 wherein the input current is decreased by reducing switching activity of the system.

11. The method of claim 10 wherein switching activity is reduced by gating clock signals to the processor core from within the system.

12. The method of claim 10 wherein switching activity is reduced by using a pipeline architecture in the core that responds to the feedback current, wherein the feedback current indicates that the current consumption of the system is over a prescribed limit.

13. The method of claim 1 wherein the input current is decreased by reducing supply voltage to the processor core from within the system.

14. The method of claim 1 wherein the input current is decreased by reducing operating frequency of the processor core from within the system.

15. The method of claim 1 wherein current is sensed by mirroring input current inline with the power supply input and compensating for a portion of a voltage drop introduced by mirroring.

16. The method of claim 1 wherein current is sensed by mirroring input current using opposing field effect transistors and maintaining outputs of the field effect transistors at the same voltage through a feedback control loop between the outputs.

17. The method of claim 16 wherein the feedback control loop comprises of an operational amplifier that operates appropriately when the mirror field effect transistors operate in their triode region.

18. The method of claim 17 comprising level shifting inputs to the operational amplifier to ensure appropriate operation of the operational amplifier when the mirror field effect transistors operate in their triode region.

19. The method of claim 1 wherein the processor core is a general purpose processor core.

20. The method of claim 1 wherein the processor core is a cryptographic processor core.

21. The method of claim 1 wherein the system is a system-on-chip.

22. The method of claim 1 wherein the system is a system-on-package.

23. A system comprising: a) a processor core, b) a power supply input c) a current sensor for sensing, from within the system, an input current at a power supply input to the system and a feedback current at the processor core; and d) a control adapted to control, based on the input current and feedback current, the current consumption of the system such that the current consumption of the system is reduced if over a reference current threshold, and increased if below a reference current threshold.

24. The system of claim 23 wherein the control is an analog controlled source.

25. The system of claim 24 wherein the input current is increased by injecting additional current within the system through digital injections cells that work at higher frequencies than clock core frequency of the core.

26. The system of claim 24 wherein the analog controlled source is a wide MOS transistor controlled by a gate signal.

27. The system of claim 23 wherein the input current is increased by increasing switching activity of the system.

28. The system of claim 23 wherein the input current is increased by increasing voltage supply of the core.

29. The system of claim 23 wherein the input current is increased by increasing clock frequency of the core.

30. The system of claim 23 further comprising one or more digital injection cells wherein the input current is increased by injecting additional current within the system through the one or more digital injection cells that work at higher frequencies than clock frequency of the core.

31. The system of claim 30 further comprising an injection current control for controlling the digital injection cells wherein the injection current control responds to the feedback current, wherein the feedback current indicates that the current consumption of the system is under a prescribed limit.

32. The system of claim 31 wherein the amount of increased switching activity is controlled based on the input current.

33. The system of claim 23 wherein the input current is decreased by reducing switching activity of the system.

34. The system of claim 23 wherein the input current is decreased by reducing supply voltage to the core from within the system.

35. The system of claim 23 wherein the input current is decreased by reducing operating frequency of the core from within the system.

36. The system of claim 33 wherein switching activity is reduced by gating clock signals to the core from within the system.

37. The system of claim 33 wherein switching activity is reduced by using a pipeline architecture in the core that responds to the feedback current, wherein the feedback current indicates that the current consumption of the system is over a prescribed limit.

38. The system of claim 23 wherein the current sensor is adapted to sense the current by mirroring input current inline with the power supply input and compensating for a portion of a voltage drop introduced by mirroring.

39. The system of claim 23 wherein the current sensor is adapted to sense the current by mirroring input current using opposing field effect transistors and maintaining outputs of the field effect transistors at the same voltage through a feedback control loop between the outputs.

40. The system of claim 39 wherein the feedback control loop comprises an operational amplifier that operates appropriately when the mirror field effect transistors operate in their triode region.

41. The system of claim 40 comprising level shifting inputs to the operational amplifier to ensure appropriate operation of the operational amplifier when the mirror field effect transistors operate in their triode region.

42. The system of claim 23 wherein the system is a system-on-chip.

43. The system of claim 23 wherein the system is a system-on-package.

44. The system of claim 23 wherein the processor core is a cryptographic processor core.

45. The system of claim 23 wherein the processor core is a general purpose processor core.

46. The system of claim 23 wherein the system is tamper resistant to resist external access to core current consumption information, except at the power supply input to the system.

47. A current flattening device for use in association with a processor core, the device comprising: a) a current sensor for sensing, from within the device, an input current at a power supply input to the device and a feedback current at the processor core, and b) a control adapted to control, based on the input current and feedback current, combined current consumption of the device and the core such that the combined current consumption is reduced if over a reference current threshold, and increased if below a reference current threshold.

48. The device of claim 47 wherein the device and the core are a system-on-chip.

49. The device of claim 47 wherein the device and the core are a system-on-package.

50. The device of claim 47 wherein the processor core is a cryptographic core.

51. The device of claim 47 wherein the processor core is a general purpose processor core.

* * * * *